United States Patent
Valentino

(10) Patent No.: US 7,638,993 B2
(45) Date of Patent: Dec. 29, 2009

(54) METHOD OF FEEDBACK CONTROLLING A SWITCHED REGULATOR

(75) Inventor: Gianluca Valentino, Cornaredo (IT)

(73) Assignee: STMicroelectronics, S.R.L., Agrate Brianza (MI) (IT)

( * ) Notice: Subject to any disclaimer, the term of this patent is extended or adjusted under 35 U.S.C. 154(b) by 169 days.

(21) Appl. No.: 11/767,082

(22) Filed: Jun. 22, 2007

(65) Prior Publication Data
US 2008/0030183 A1    Feb. 7, 2008

(30) Foreign Application Priority Data
Jun. 23, 2006   (EP)   ................... 06425431

(51) Int. Cl.
   *G05F 1/10*    (2006.01)
   *G05F 1/652*   (2006.01)
(52) U.S. Cl. .................. 323/282; 323/222; 323/284; 323/265
(58) Field of Classification Search ............... 323/282, 323/283, 284, 285, 222, 265
   See application file for complete search history.

(56) References Cited

U.S. PATENT DOCUMENTS

| | | | |
|---|---|---|---|
| 5,747,977 A | 5/1998 | Hwang | 323/284 |
| 5,905,370 A * | 5/1999 | Bryson | 323/283 |
| 6,034,517 A * | 3/2000 | Schenkel | 323/283 |
| 6,366,070 B1 | 4/2002 | Cooke et al. | 323/284 |
| 6,396,252 B1 * | 5/2002 | Culpepper et al. | 323/285 |
| 2004/0174152 A1 | 9/2004 | Hwang et al. | 323/284 |

FOREIGN PATENT DOCUMENTS

EP   0709948   5/1996

* cited by examiner

*Primary Examiner*—Bao Q Vu
(74) *Attorney, Agent, or Firm*—Lisa K. Jorgenson; Allen, Dyer, Doppelt, Milbrath & Gilchrist, P.A.

(57) ABSTRACT

A method of feedback controls a switched regulator generating a regulated voltage on an output terminal and being driven by a pulse width modulated (PWM) signal that determines on-phases during which the output terminal is selectively connected to a supply line, and off-phases during which the output terminal is disconnected according to a pulse skipping mode. The method may include comparing the regulated voltage with a reference voltage, and during the on-phase of the PWM signal, selectively connecting or disconnecting the supply line to the output terminal based upon the comparing for keeping the regulated voltage constant. The method may also include incrementing, decrementing, or leaving unchanged a duty-cycle of the PWM signal at every PWM cycle also based upon the comparing.

15 Claims, 25 Drawing Sheets

METHOD OF FEEDBACK CONTROLLING A SWITCHED REGULATOR

FIELD OF THE INVENTION

This invention relates to power supply equipment and, more specifically, to pulse width modulated switching regulators.

BACKGROUND OF THE INVENTION

Conventional switching-mode voltage regulators may use analog circuitry. They generally may include a closed loop as shown in FIG. 1 comprising a switching stage controlled by a driver, a low-pass filter (typically a L-C filter) producing a regulated output voltage, a pulse width modulated (PWM) controller and a feedback error amplifier.

The switching stage is usually realized with transistors or SCRs that are switched between a fully conducting state and a non-conducting state, such that the load of the regulator may be powered for a certain Ton time interval and is disconnected from the power supply line for a Toff time interval. The Ton and Toff intervals are typically determined by a PWM control signal, the duty cycle of which is varied as a function of the load for compensating eventual variations and regulating the output voltage.

FIG. 2 illustrates one way to close the voltage loop in a regulator of the pulse skipping comparator type. The output voltage V0 supplied to the load is compared with a reference voltage Vref, and the PWM control signal is either applied or skipped to regulate the output voltage at a desired value Vref. Analog closed loop regulators may be straightforward to realize, but system stability may be obtained using relatively large capacitance values (often not easily integrated on silicon) or using rather complex filtering architectures (for example, switched capacitors filters, sigma-delta converters and digital filters).

An alternative design approach to the analog closed-loop control of a voltage regulator illustrated in FIG. 1 may comprise using a comparator, and in using the comparator output in a LOGIC CONTROL BLOCK for implementing a digital control method based on the so-called "pulse skipping", or "burst mode" or "constant Ton" technique.

The "pulse skipping" technique comprises regulating the output voltage by supplying the load for a PWM cycle with the maximum allowed duty cycle and successively leaving it unchanged for one or more consecutive PWM pulses as far as the output voltage drops to or below a certain reference voltage Vref. The "pulse skipping" technique also comprises again supplying the load for another PWM pulse at the maximum allowed duty cycle and so on. The fact that the duty cycle maintains the maximum theoretical value may ensure that the regulator produces the desired output voltage regulation with the lowest supply voltage.

A characteristic of the "pulse skipping" technique comprises transient responses being generally faster than in analog closed-loop regulators. This may be because the duty cycle is always fixed at the maximum theoretical value. In addition, the system may be intrinsically stable; there may be need for discrete silicon resistors and capacitors for loop compensation. On a different account, the output voltage ripple is larger than in analog closed-loop regulators for the same reason: the load being powered in a PWM cycle with the largest possible duty cycle. It may be difficult to control a voltage regulator with a pulse skipping technique such as to obtain a fast transient response and a small output voltage ripple.

SUMMARY OF THE INVENTION

A method is provided for controlling a switched voltage regulator with a pulse skipping technique that may ensure relatively fast transient responses and may produce a reduced output voltage ripple.

This method may comprise adjusting the duty cycle of PWM signals and eventually powering the load for one or more consecutive PWM pulses based upon the reference voltage Vref. With this modified pulse-skipping technique, the duty cycle is not always kept at its maximum value, which is the cause of the typically large ripple, but it is reduced to a smaller value under a steady state condition, and rapidly increased upon an increase of the load for shortening output voltage transients.

A related architecture of a pulse skipping switching regulator suitable for implementing this method is provided.

DETAILED DESCRIPTION OF THE PREFERRED EMBODIMENTS

Figure 1:
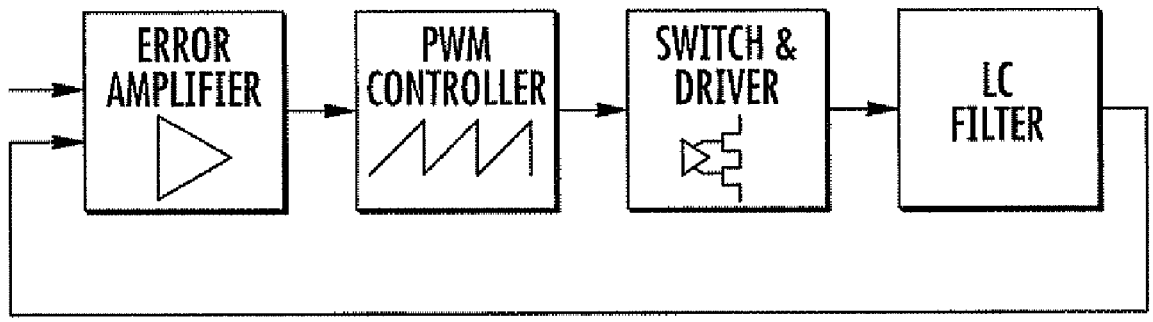
FIG. 1 depicts a closed-loop voltage regulator according to the prior art.
Figure 2:
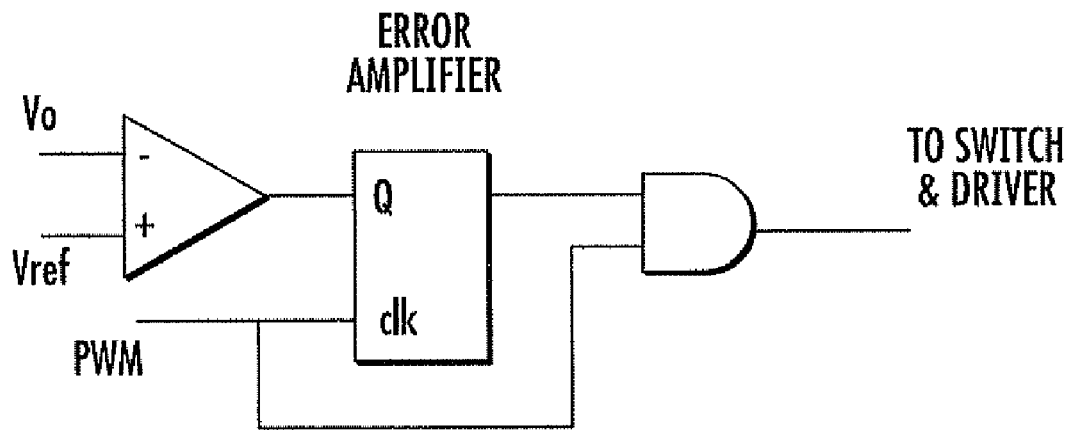
FIG. 2 depicts the SKIP LOGIC CONTROL of the regulator shown in FIG. 1 according to the prior art.
Figure 3:
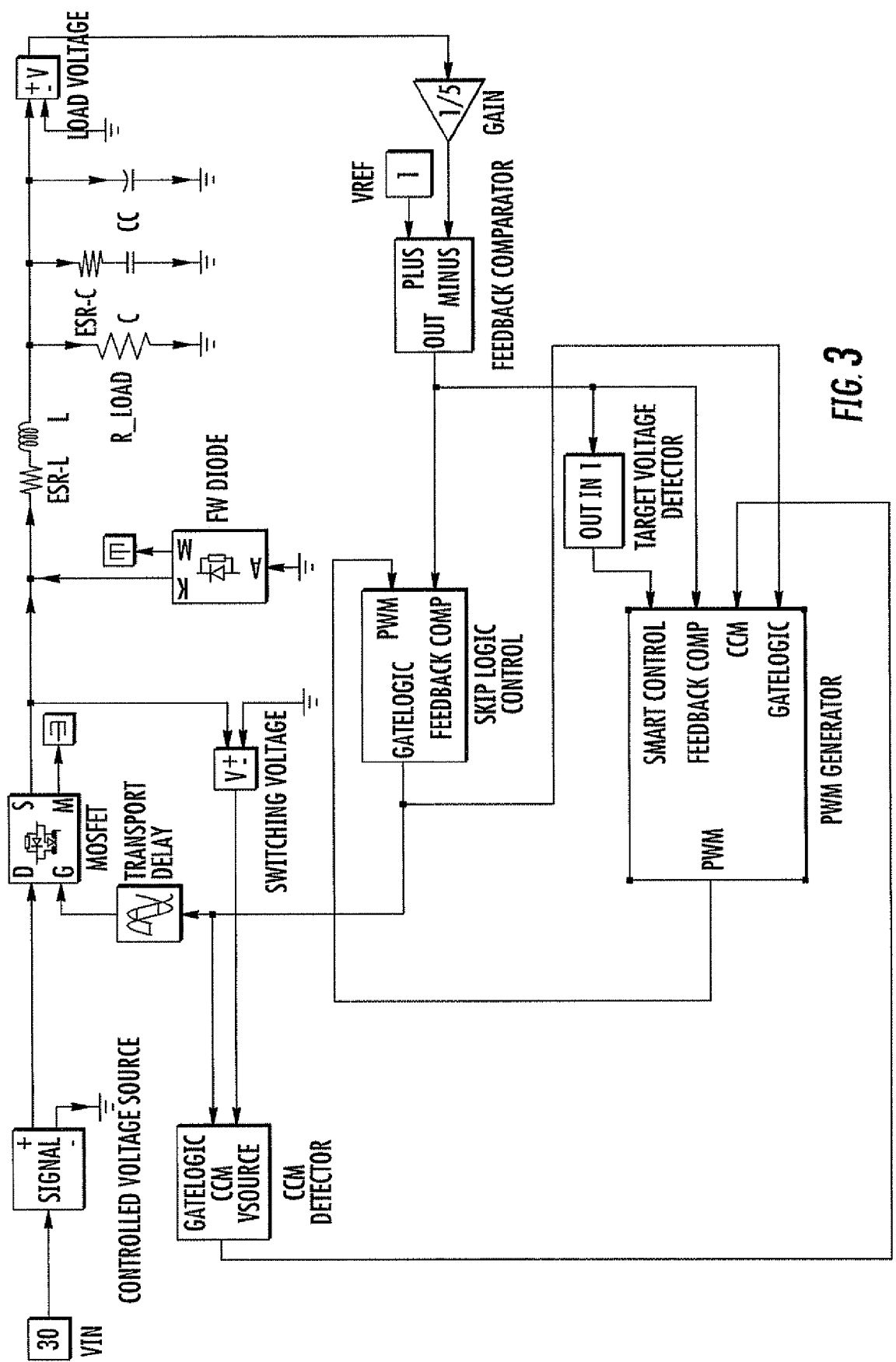
FIG. 3 shows a sample voltage regulator that uses a pulse skipping technique according to the present invention.

FIG. 3 shows a voltage regulator suitable for implementing the method according to an embodiment. The meaning of each block and of each signal is explained in the following table:

| Label | Meaning |
|---|---|
| VREF | Reference voltage |
| FEEDBACK COMPARATOR | Feedback voltage comparator |
| SKIP LOGIC CONTROL | Pulse skipping control logic |
| VIN | Input voltage supply |
| TRANSPORT DELAY | Delay block used for simulation purposes |
| ESR-C | Capacitor equivalent series resistor |
| ESR-L | Inductor equivalent series resistor |
| C | Electrolytic capacitor |
| CC | Ceramic capacitor |
| SWITCHING VOLTAGE | Switching pin voltage |
| LOAD VOLTAGE | Voltage drop on the load |
| GATELOGIC | Logic level driving gate signal |
| CCM | Flag indicating that a Continuous or discontinuous current functioning mode is in progress |
| PWM | PWM driving signal |
| TARGET VOLTAGE DETECTOR | Circuit used to decide the End of the SoftStart sequence |
| SMARTCONTROL | Flag indicating that the closed loop DC % control invention is valid |
| MOSFET | Mosfet switch used in the regulator |
| R_LOAD | Resistive load |
| OUT | Comparison logic signal |

The Mosfet on/off state is driven by the SKIPLOGIC CONTROL block. The functioning of the SKIP LOGIC CONTROL block depends on the state of the FEEDBACK COMPARATOR, since the GATELOGIC signal may switch on the Mosfet only when the FEEDBACK COMP signal is sampled in correspondence of the leading edge of the PWM signal.

Figure 4:
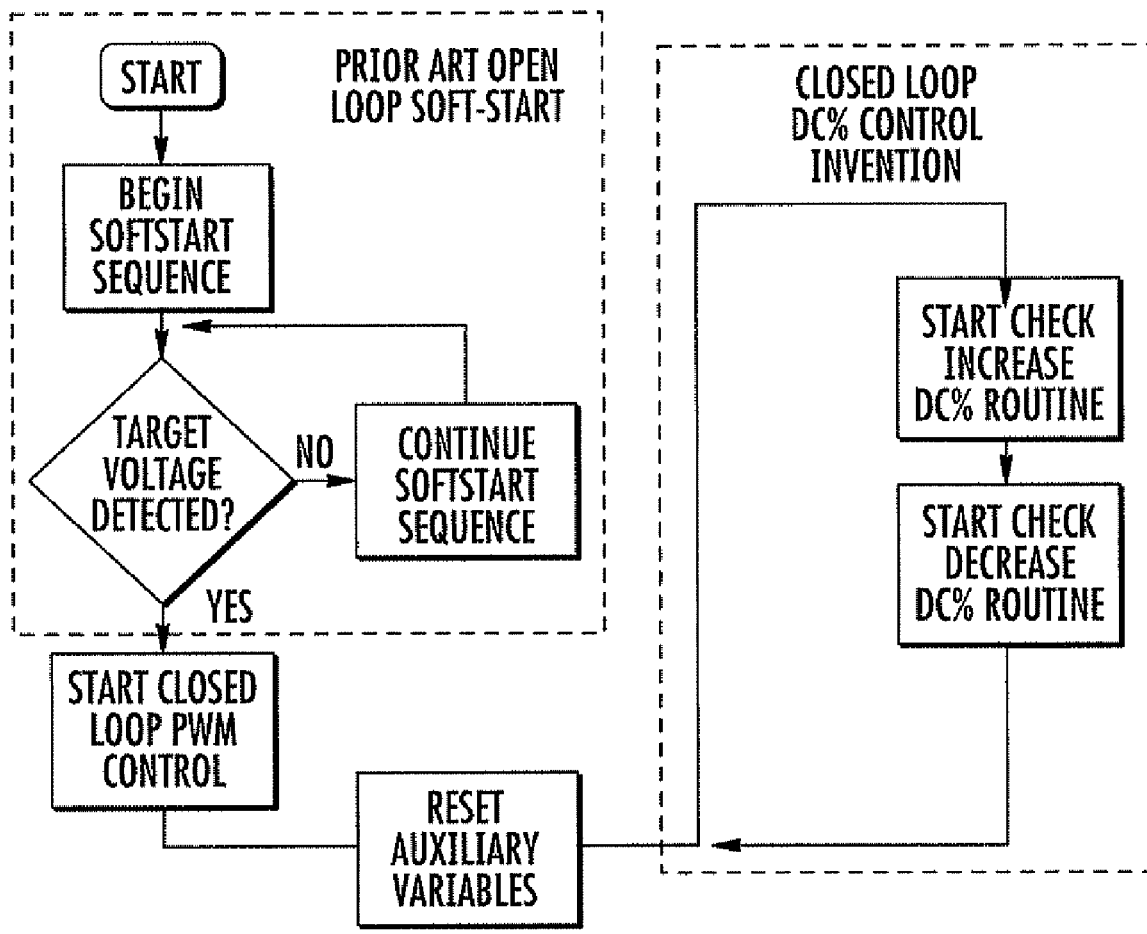
FIG. 4 is a basic flow chart of an embodiment of the method according to the present invention.

A basic flow chart of an embodiment of this method is depicted in FIG. 4. The duty cycle of the PWM signal may be gradually increased with any classic soft-start procedure that terminates when the load is supplied with the desired voltage Vref. Typically, the duty cycle is increased linearly in an open loop mode by changing the phase during which the PWM signal is active and/or by changing the frequency of the PWM signal.

When the voltage drop on the load has reached a desired value, the regulator may be still kept in an open-loop state for a pre-established period Twait, during which the duty cycle is further increased before starting a closed-loop control according to this method. This may prevent noise, spikes or overshoots on the output voltage that cause a premature beginning of the closed-loop control before the voltage drop on the load has stably reached the desired design value Vref.

Before starting the closed loop control method of this embodiment, the auxiliary variables involved in the method steps are reset. The closed loop control method according to this embodiment comprises the steps of sampling the voltage drop on the load at the beginning of each PWM cycle, powering the load or disconnecting it for one or more PWM cycles according to a pulse skipping technique and adjusting the duty cycle in function of the difference between the output voltage and the reference voltage Vref. The duty cycle may be adjusted by executing two routines: the CHECK INCREASE routine and the CHECK DECREASE routine for increasing and decreasing, respectively, or even leaving unchanged the duty cycle of the PWM signal.

Check Increase Routine

Figure 5:
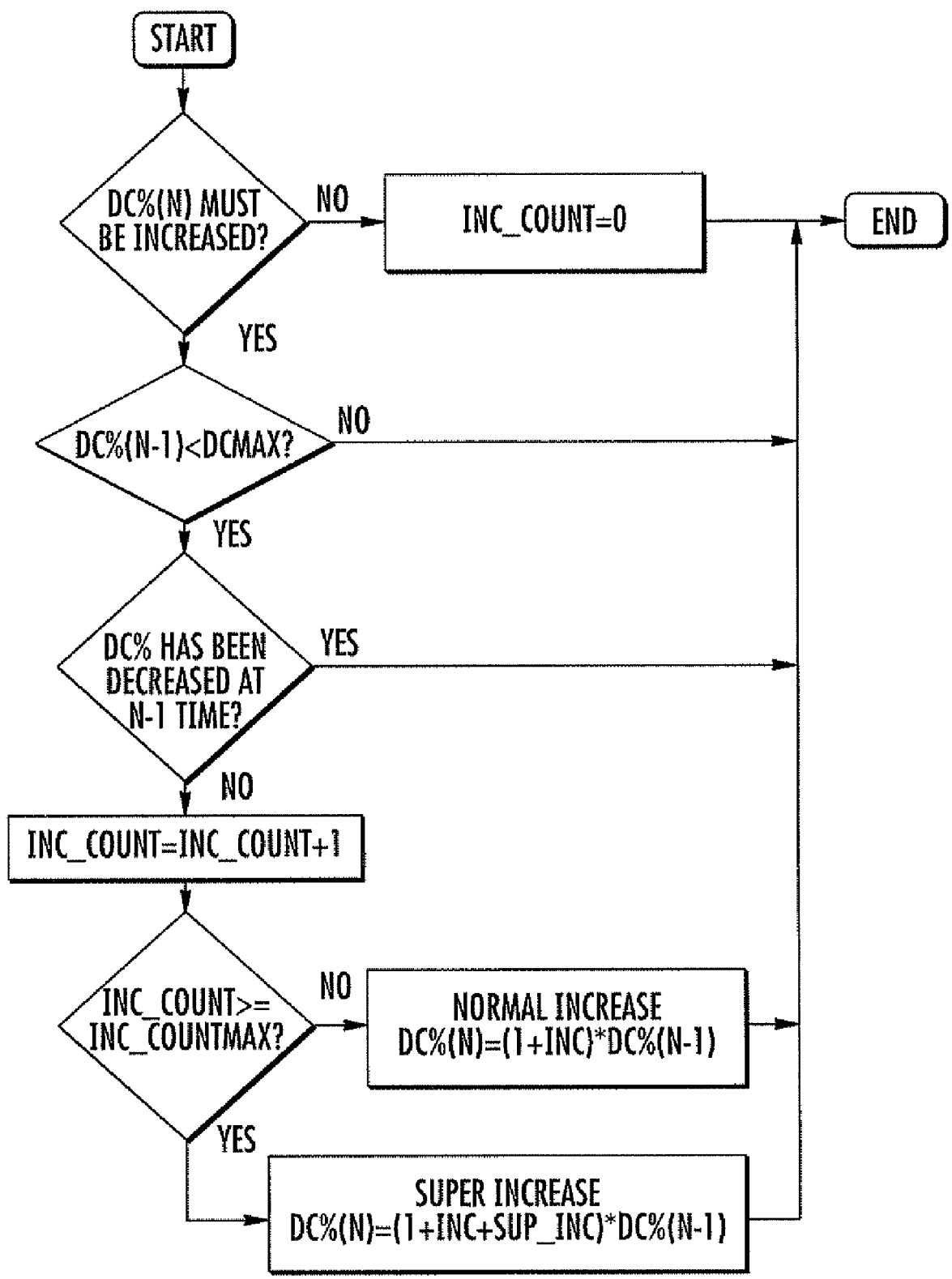
FIG. 5 is a flow chart of the embodiment of the CHECK INCREASE routine of FIG. 4 according to the present invention.

A flow chart of this routine is depicted in FIG. 5. The meaning of each variable or constant is explained in the following table:

| | |
|---|---|
| INC_COUNT | Number of consecutive PWM cycles in which the duty cycle has been increased |
| DC %(n) | Duty cycle at $n^{th}$ PWM cycle from the beginning of the closed loop control |
| INC_COUNTmax | Pre-established threshold value of INC_COUNT for starting the SUPER INCREASE step |
| DCmax | Maximum admissible duty cycle |
| INC | Pre-established percentage increment of the duty cycle |
| SUP_INC | Pre-established supplementary Percentage increment of the duty cycle |

According to the embodiment of this method, it is checked whether the duty cycle should be increased or not. The duty cycle may be increased if during the current PWM cycle and during the previous PWM cycle the voltage drop on the load is below a reference voltage Vref. As an alternative, the duty cycle may be increased if for only one or for at least three (or more) consecutive PWM cycles the voltage drop on the load is below the reference voltage.

If it is decided that the duty cycle should be increased, it is checked whether or not the duty cycle is smaller than the maximum admissible value DCmax. In the latter case the CHECK INCREASE routine is stopped because the duty cycle cannot be increased further. In the former case, according to this embodiment, it is checked whether the duty cycle in the previous PWN cycle has been decreased or not. If so, it may be preferable not to increase the duty cycle but to leave it unchanged, for simplifying the control method, while in the opposite case, the variable INC_COUNT is incremented. According to a less preferred alternative, this optional check may be omitted.

If the variable INC_COUNT has reached or surpassed a pre-established maximum value INC_COUNTmax, the duty cycle is increased according to the SUPER INCREASE formula.

$$DC\%(n) = (1+INC+SUP\_INC)*DC\%(n-1)$$

otherwise according to the NORMAL INCREASE formula:

$$DC\%(n) = (1+INC)*DC\%(n-1)$$

Figure 6:
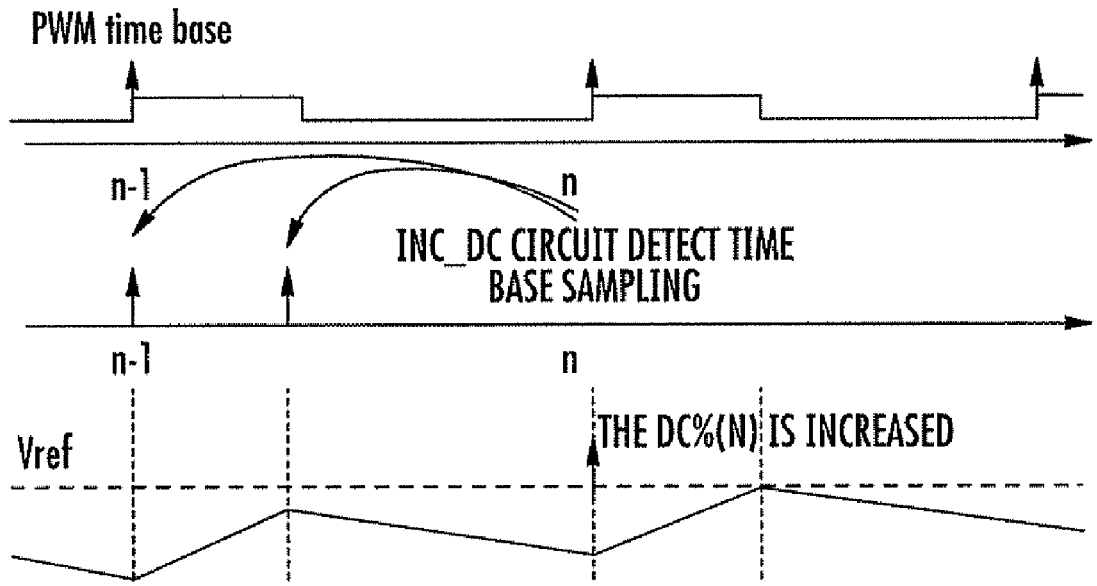
FIG. 6 is a sample time graph of a PWM driving signal and of a regulated output voltage generated by implementing the CHECK INCREASE routine of FIG. 5 according to the present invention.
Figure 7:
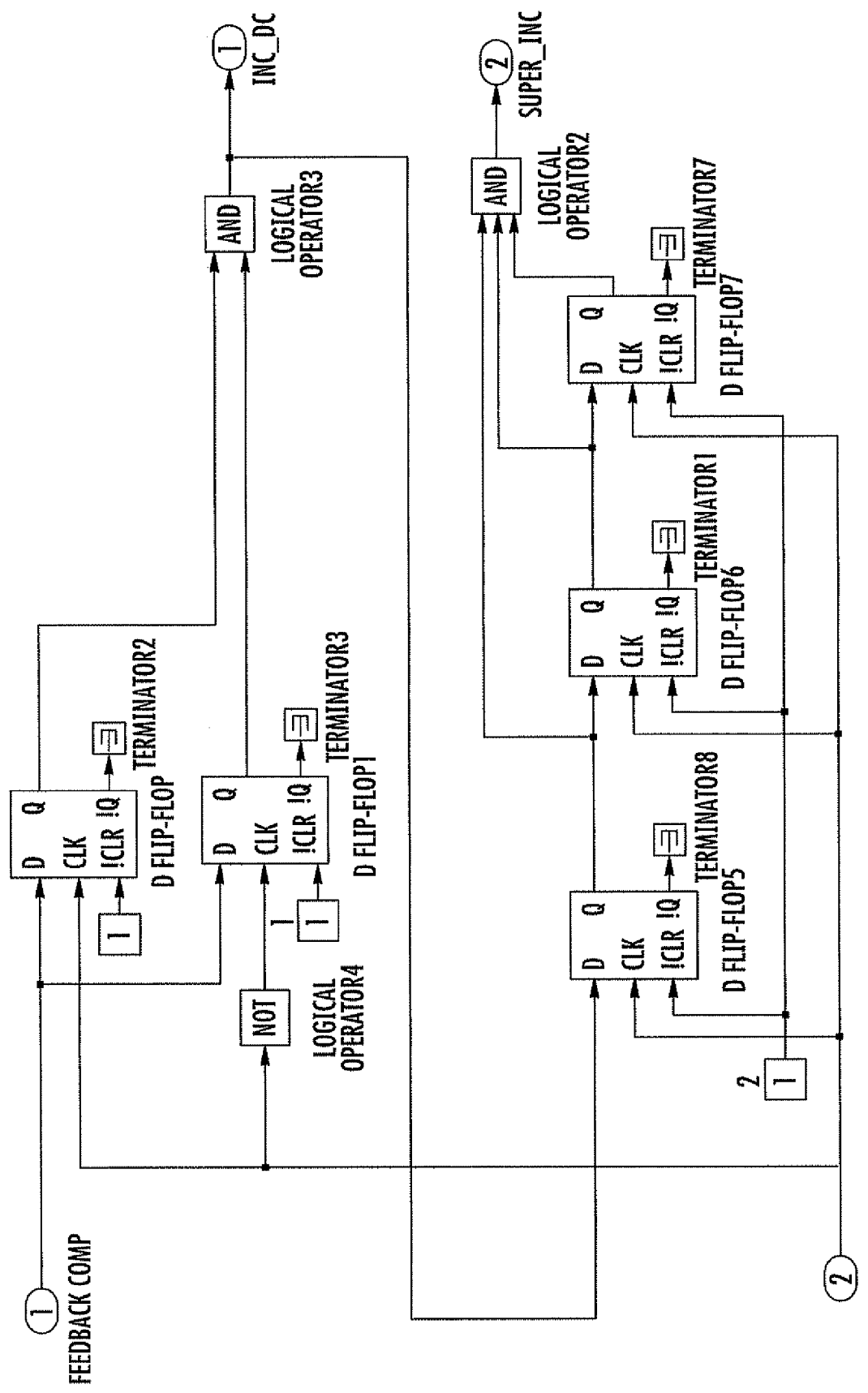
FIG. 7 is a circuit schematic diagram included in the block PWM GENERATOR of the regulator of FIG. 3 for implementing the CHECK INCREASE routine according to the present invention.

A sample time diagram, for illustrating the Check Increase routine, of a PWM signal and the relative voltage drop on the load is depicted in FIG. 6. FIG. 7 shows a logic circuit to check if the Super Increase or the Normal Increase steps may be executed. The functioning of this circuit, included in the block PWM GENERATOR of the regulator of FIG. 3, is explained hereinbelow.

The decision to execute or not a NORMAL INCREASE operation (INC_DC) is made by sampling the FEEDBACK COMP signal on the leading and trailing edge of the PWM signal, as shown in FIG. 6. Then the decision to execute or not a SUPER INCREASE operation is done by sampling the (INC_DC) signal at every PWM leading edge: in this particular sample case, three D-latch have been used since the constant INC_COUNTmax has been fixed to 3.

Check Decrease Routine

Figure 8:
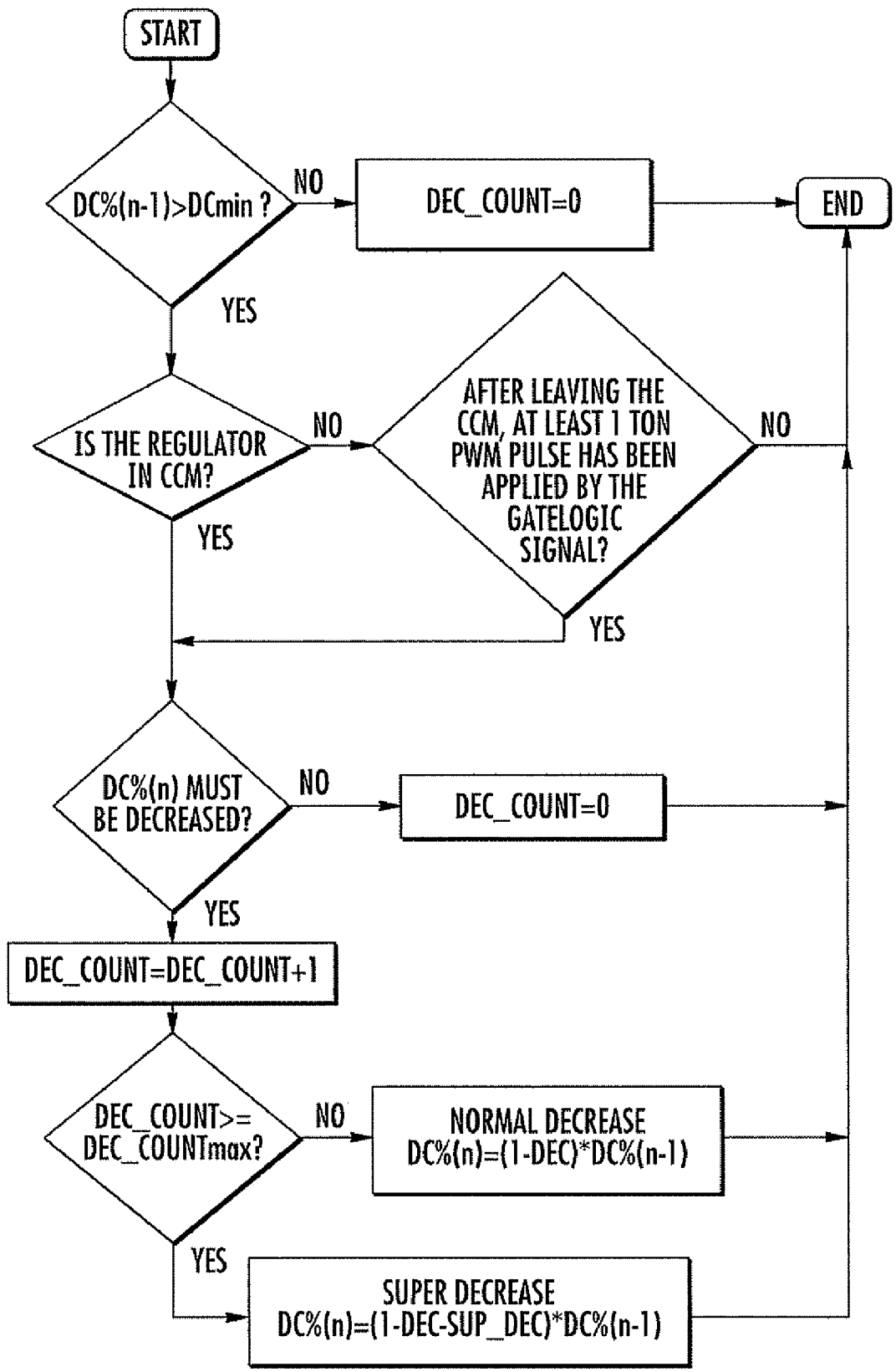
FIG. 8 is a flow chart of the embodiment of the CHECK DECREASE routine of FIG. 4 according to the present invention.

A flow chart of this routine is depicted in FIG. 8. The meaning of each variable or constant is explained in the following table:

| | |
|---|---|
| DEC_COUNT | Number of consecutive PWM cycles in which the duty cycle has been decreased |
| DC %(n) | Duty cycle at $n^{th}$ PWM cycle from the beginning of the closed loop control |
| DEC_COUNTmax | Pre-established threshold value of DEC_COUNT for starting the SUPER DECREASE step |
| DCmin | Maximum admissible duty cycle |
| DEC | Pre-established percentage decrement of the duty cycle |
| SUP_DEC | Pre-established supplementary percentage decrement of the duty cycle |

This routine is substantially dual more so than the CHECK INCREASE routine, besides the fact that a check for verifying whether the regulator is functioning in continuous or discontinuous current mode is carried out. The operations to be carried out according to the method depend on whether a continuous current mode (CCM) or a discontinuous current mode (DCM) are in progress.

CCM

Figure 9:
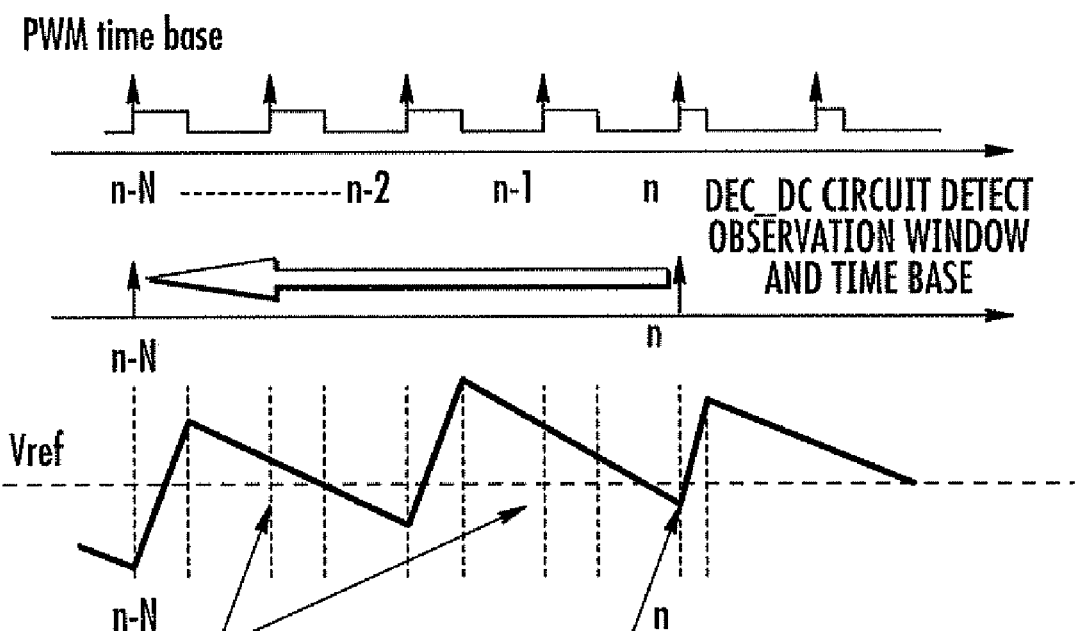
FIG. 9 is a sample time graph of a PWM driving signal and of a regulated output voltage generated by implementing the CHECK DECREASE routine of FIG. 8 in continuous current mode according to the present invention.

The regulator verifies whether in the last N consecutive PWM pulses, at least a pulse has been skipped. According to an embodiment, when the regulator has skipped a plurality of pulses during the last N consecutive PWM pulses, the duty cycle is varied, as shown in FIG. 9 (PWM pulses from n−N to n−1): in this case, the new duty cycle is calculated according to the NORMAL DECREASE formula $$DC\%(n) = (1-DEC)*DC\%(n-1)$$

or to the SUPER DECREASE formula $$DC\%(n) = (1-DEC\_SUP\_DEC)*DC\%(n-1)$$

depending on the value of the variable DEC_COUNT.

DCM

Figure 10:
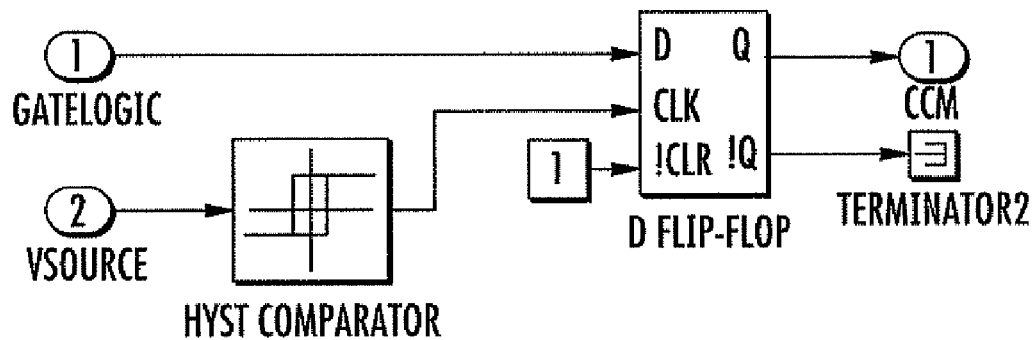
FIG. 10 is a circuit schematic diagram included in the block CCM DETECTOR of the regulator of FIG. 3 for implementing the CHECK DECREASE routine in discontinuous current mode according to the present invention.
Figure 11:
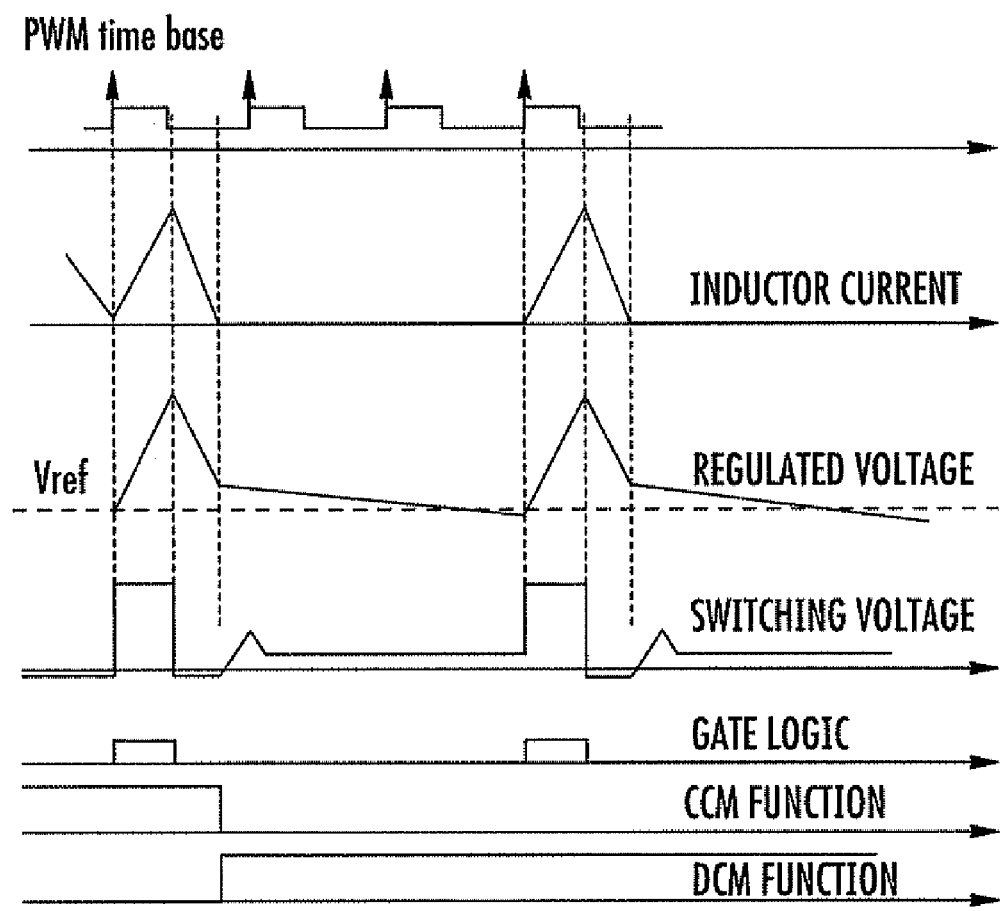
FIGS. 11 to 13 are sample time graphs of a PWM driving signal and of a regulated output voltage generated by implementing the CHECK DECREASE routine of FIG. 8 in discontinuous current mode according to the present invention.

The information on DCM mode comes from a circuit that compares the output current with a certain threshold. This information is used as clock to sample the GATELOGIC signal coming from the pulse skipping logic. As soon as the current in the inductor has become zero and the GATELOGIC signal is also zero, the DCM mode is asserted. A sample circuit for commanding the discontinuous current functioning mode is depicted in detail in FIG. 10 and corresponds to the block CCM DETECTOR in FIG. 3. It comprises a hysteresis comparator HYST COMPARATOR that transforms the switching signal VSOURCE in a square wave signal used to clock a D-latch that samples the GATELOGIC signal.

If the regulator is functioning in discontinuous current mode, according to this embodiment, it is checked whether or not after leaving the continuous current mode at least one supply pulse has been provided to the load. The reason for waiting at least one Ton pulse on GATELOGIC signal before starting to decrease the duty cycle is due to the fact that it is worth maintaining the regulator working in "pulse skipping" mode also in DCM, in order to have fast transient responses, that are typical of pulse skipping regulators.

Figure 12:
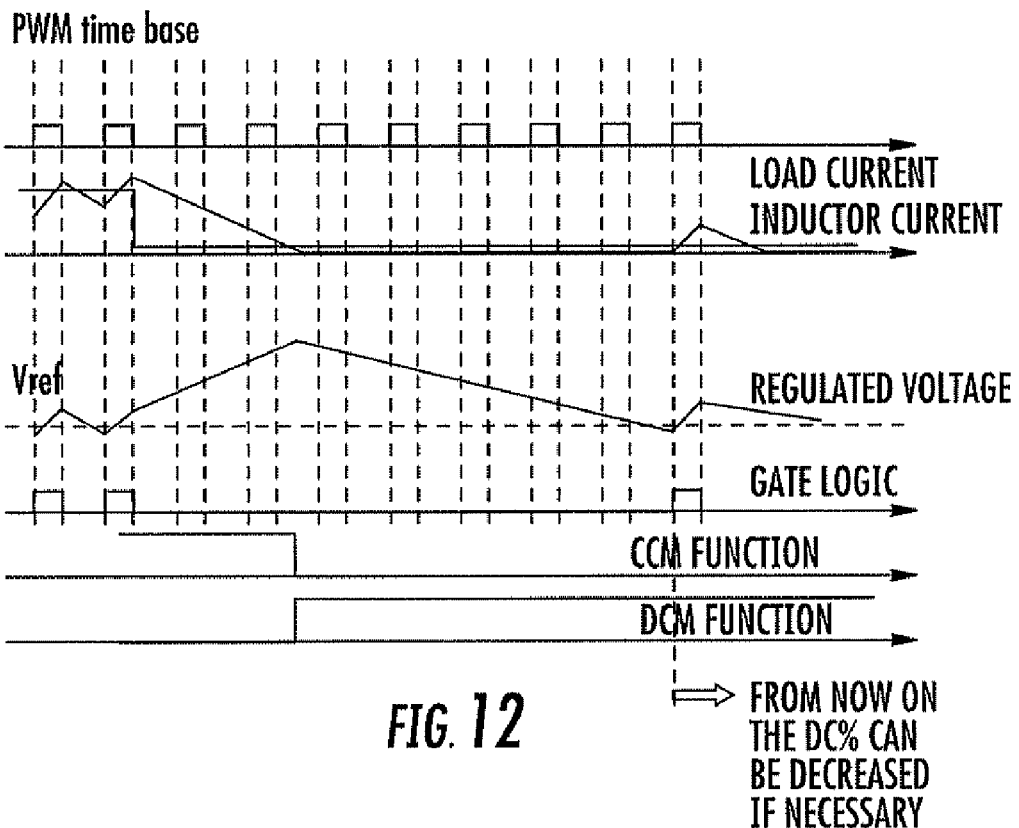

If the regulator is working in CCM, then the load current quickly goes to zero. As a consequence, the inductor current becomes zero and the regulated voltage start decreasing. This situation is exemplified in FIG. 12. The criterion to decide if the duty cycle may be decreased or not in DCM is based on the previous sampled values of the feedback comparator, as in CCM.

Figure 13:
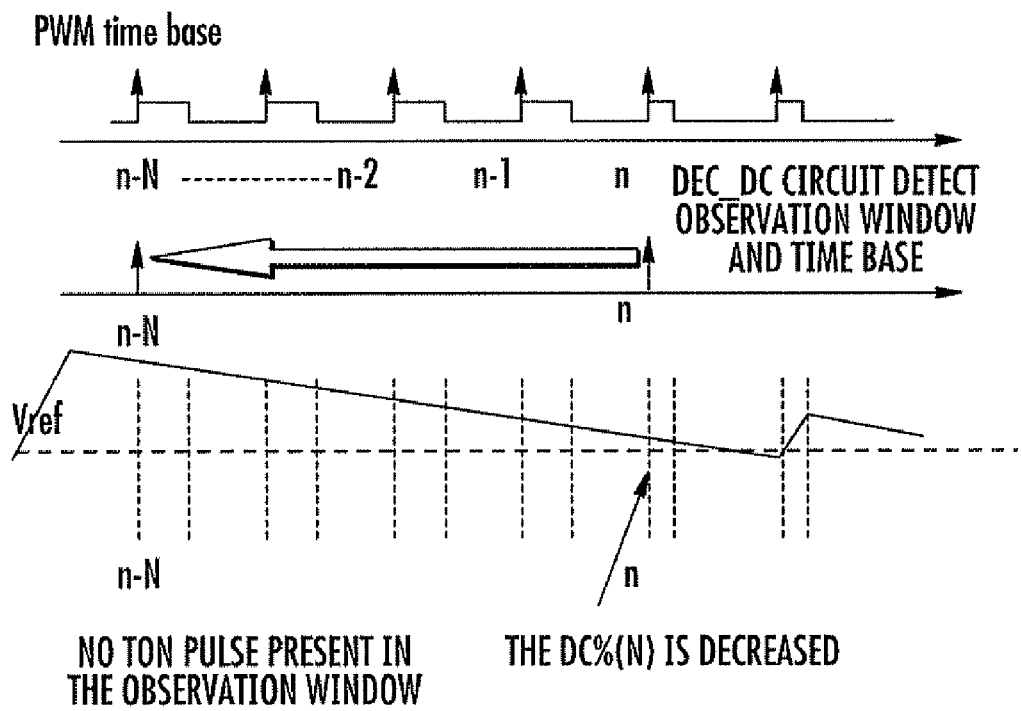

If no Ton GateLogic pulses are generated, then the Normal Decrease routine is executed. The sample graphs of FIG. 13 illustrate this situation. By resuming, with the closed-loop control method of this embodiment:

in CCM: the regulator is kept functioning at the minimum duty cycle, skipping at most one Ton conduction cycle during the last N PWM periods.

in DCM: the regulator is kept functioning at the minimum duty cycle, applying at least one Ton conduction cycle during the last N PWM periods.

Simulation Results

The functioning of the regulator of FIG. 3 controlled according to this embodiment of the method has been simulated using a MATLAB™ Simulink model. The values of parameters used for the simulation are listed in the following table:

| Parameter | Value |
|---|---|
| INC | 0.1 |
| DEC | 0.1 |
| SUP_INC | 0.5 |
| SUP_DEC | 0 |
| INC_COUNTmax | 3 |
| DEC_COUNTmax | don't care |
| DCmax | 100% |
| DCmin | 0% |
| N | 5 |
| Vsupply | 30 v |
| Vregulated | 5 V |
| Vret | 1 V |
| Resistor divider ratio | 1/5 |
| L | 220 µH |
| ESR-L | 130 mΩ |
| C | 330 µF |
| ESR-C | 130 mΩ |
| PWM frequency | 200 kHz |

Figure 14:
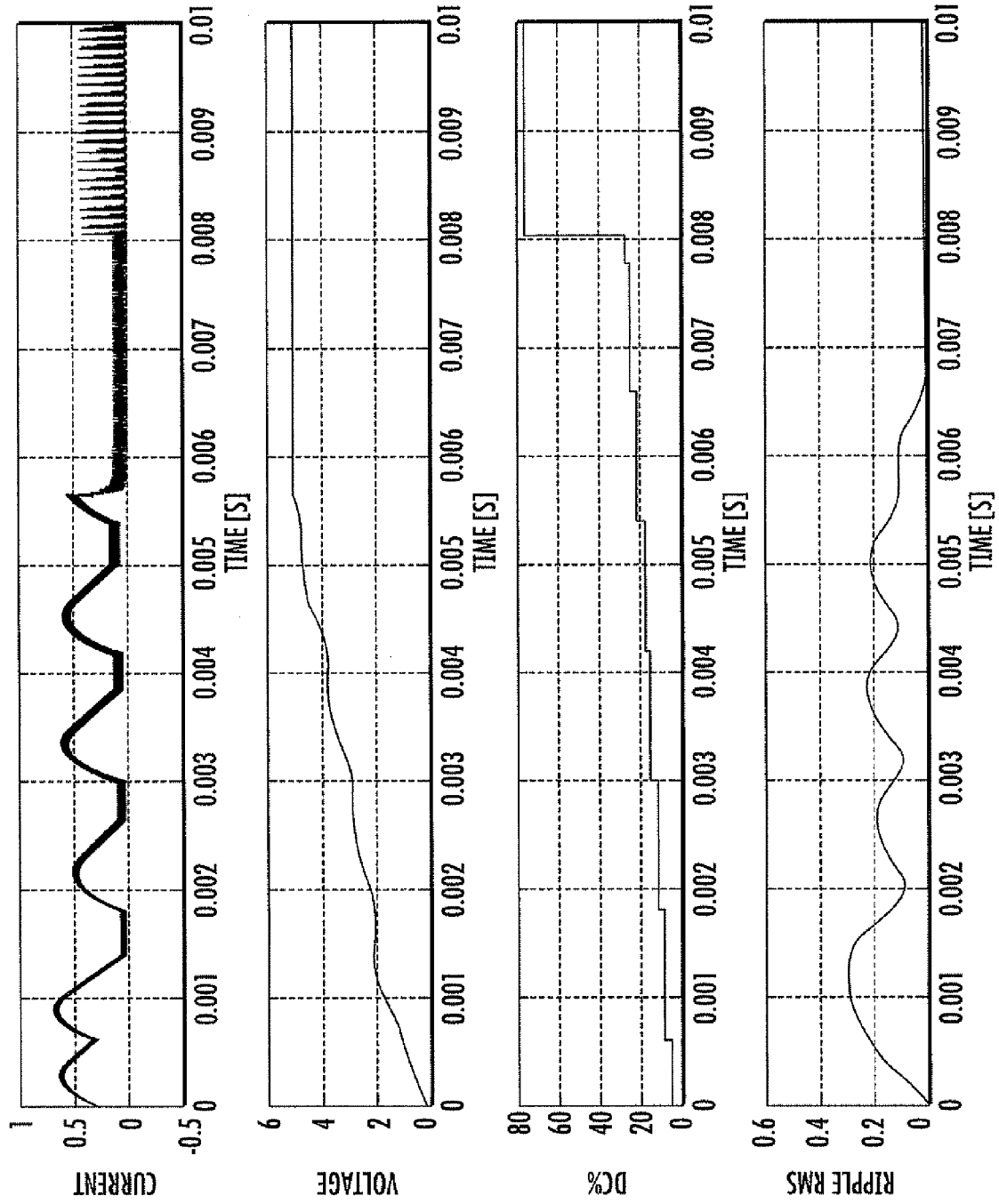
FIGS. 14 and 16 show simulation graphs of the functioning of the regulator of FIG. 3 implementing a prior art pulse skipping technique, powering a resistive load absorbing a current of 50 mA.
Figure 15:
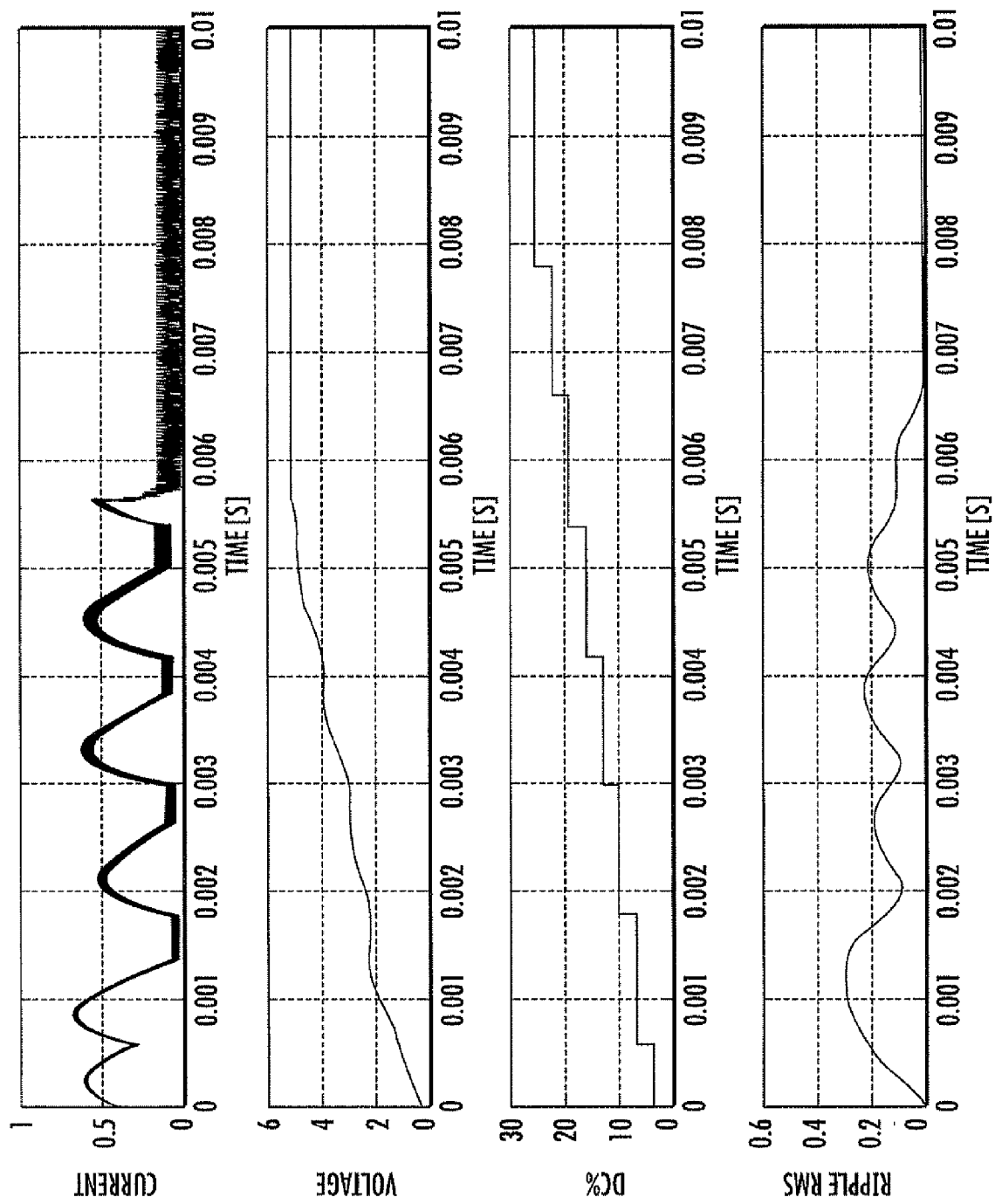
FIGS. 15 and 17 show simulation graphs of the functioning of the regulator of FIG. 3 implementing an embodiment of the method according to the present invention, powering a resistive load absorbing a current of 50 mA.

FIGS. 14 and 15 depict simulation graphs of the main signals of the regulator of FIG. 3 supplying a resistive load with a current of 50 mA, controlled according to a prior art pulse skipping technique and according to the method of this embodiment, respectively. In the first case, according to common pulse skipping technique, the duty cycle is fixed at the maximum allowed value when the start-up procedure ends at about 0.008 s. By contrast, in the latter case the duty cycle is adjusted according to the needs after the start-up procedure.

Figure 16:
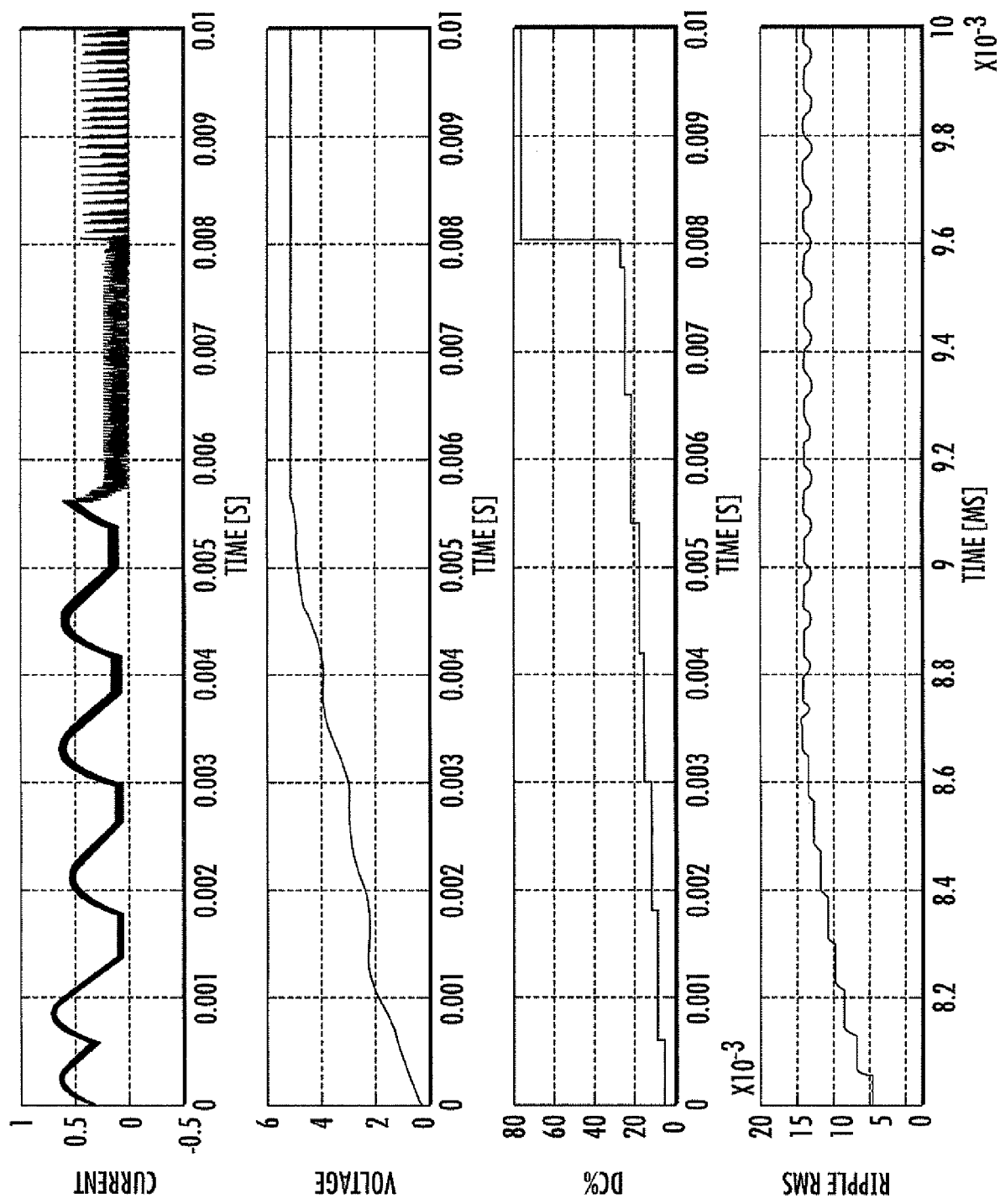
Figure 17:
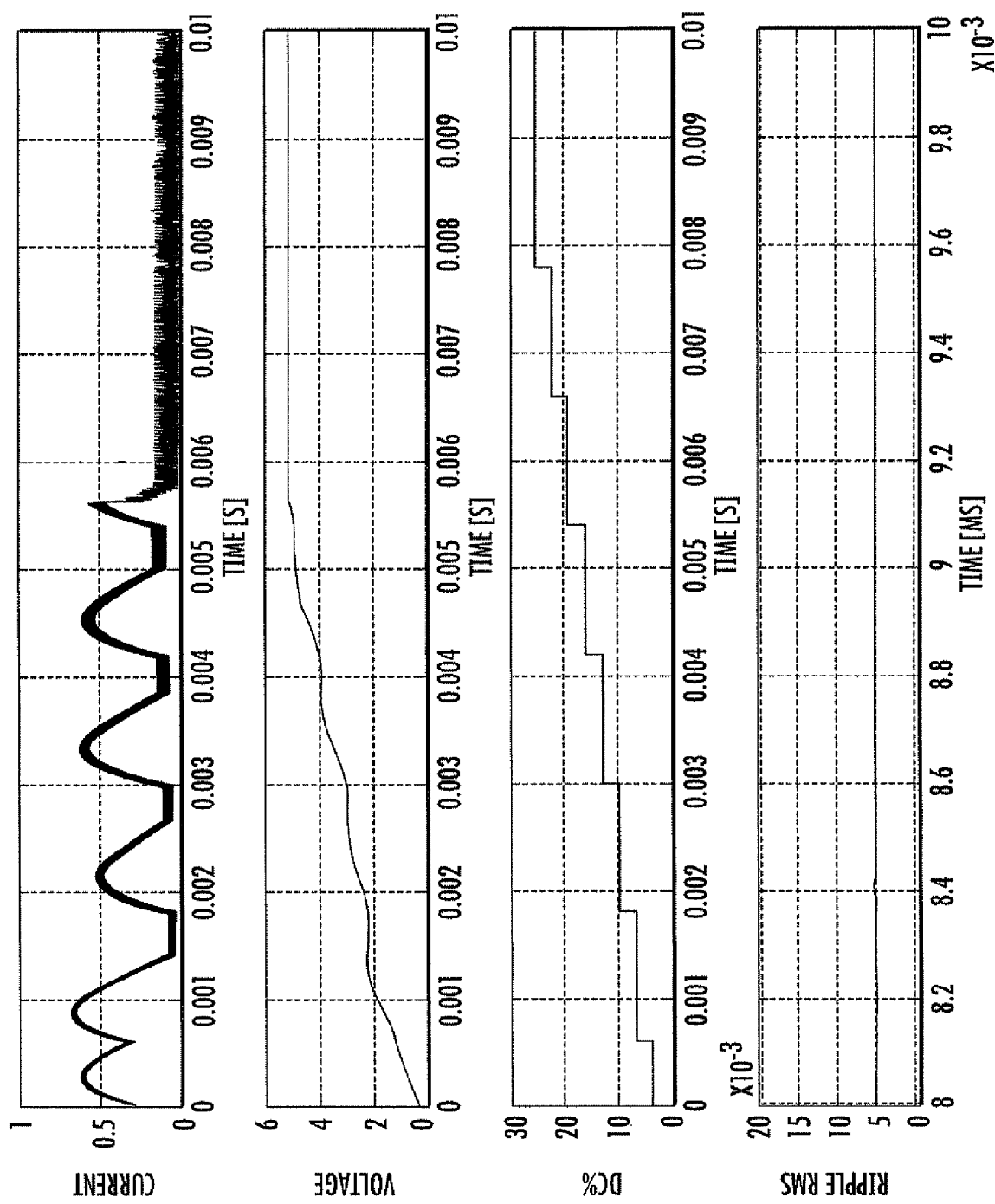
Figure 18:
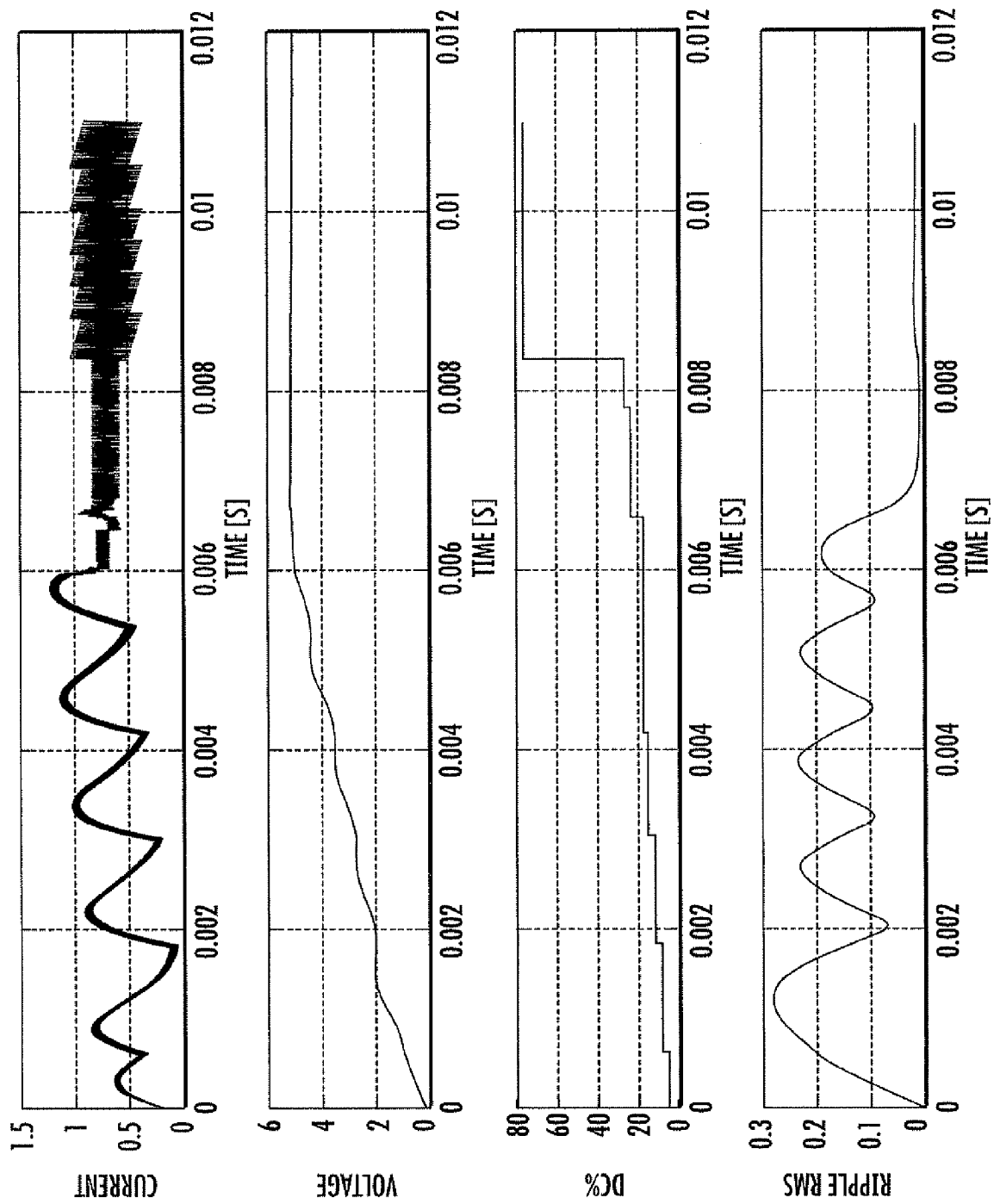
FIGS. 18 and 20 show simulation graphs of the functioning of the regulator of FIG. 3 implementing a prior art pulse skipping technique, powering a resistive load absorbing a current of 0.7 A.
Figure 19:
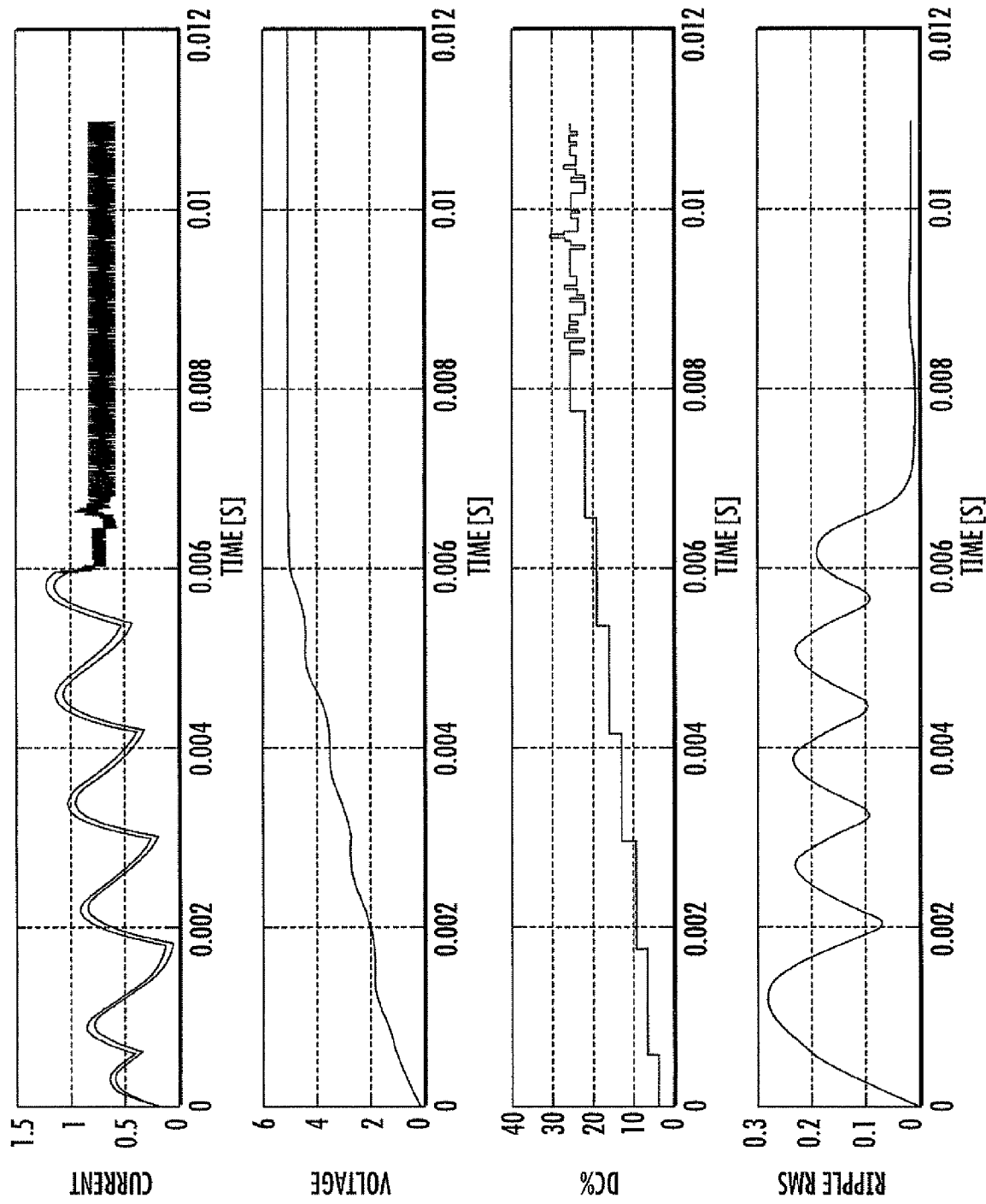
FIGS. 19 and 21 show simulation graphs of the functioning of the regulator of FIG. 3 implementing an embodiment of the method according to the present invention, powering a resistive load absorbing a current of 0.7 A.

The magnified views of FIGS. 16 and 17 of the root-mean-square (RMS) ripple of FIGS. 14 and 15, respectively, show that the RMS voltage ripple obtained with the method of this embodiment (FIG. 17) is only one third of that obtained with a prior art control method (FIG. 16).

The simulations graphs from FIG. 18 to FIG. 21 are analogous to those from FIG. 14 to FIG. 17, respectively, but they are obtained for a resistive load that absorbs a current of 0.7 A. From FIG. 20 it is possible to notice that the continuous component of the voltage drop on the load is not at the desired design value of 5V when using a prior art control method, but it is at a voltage of 5.02V. In practice, using a prior art control method, there may be an output offset of about 0.02V and a RMS voltage ripple of about 17 mV. This output offset voltage is substantially intrinsic in prior art pulse skipping techniques because the load is powered during a PWM conduction phase with the largest possible duty cycle, thus the output voltage becomes relevantly larger than the reference voltage Vref when the load is powered.

By contrast, the regulator of FIG. 3 controlled according to the method of this embodiment may not generate any output offset, and the RMS voltage ripple is about 7 mV because the duty cycle is reduced, when it may be necessary. It is worth noticing that, using the method of this embodiment, the duty cycle oscillates around a certain value. This is due to the pulse skipping technique and also to the fact that the regulator of this embodiment is digital, thus the duty cycle is not continuously adjusted, as it would be in an analog closed-loop control method, but it may be varied only in correspondence of non skipped PWM pulses.

FIGS. 22 to 25 are substantially identical to FIGS. 14 to 17, respectively, except for a pulse of 1 A absorbed by the load at about 0.009 s and that terminates at 0.01 s.

Figure 23:
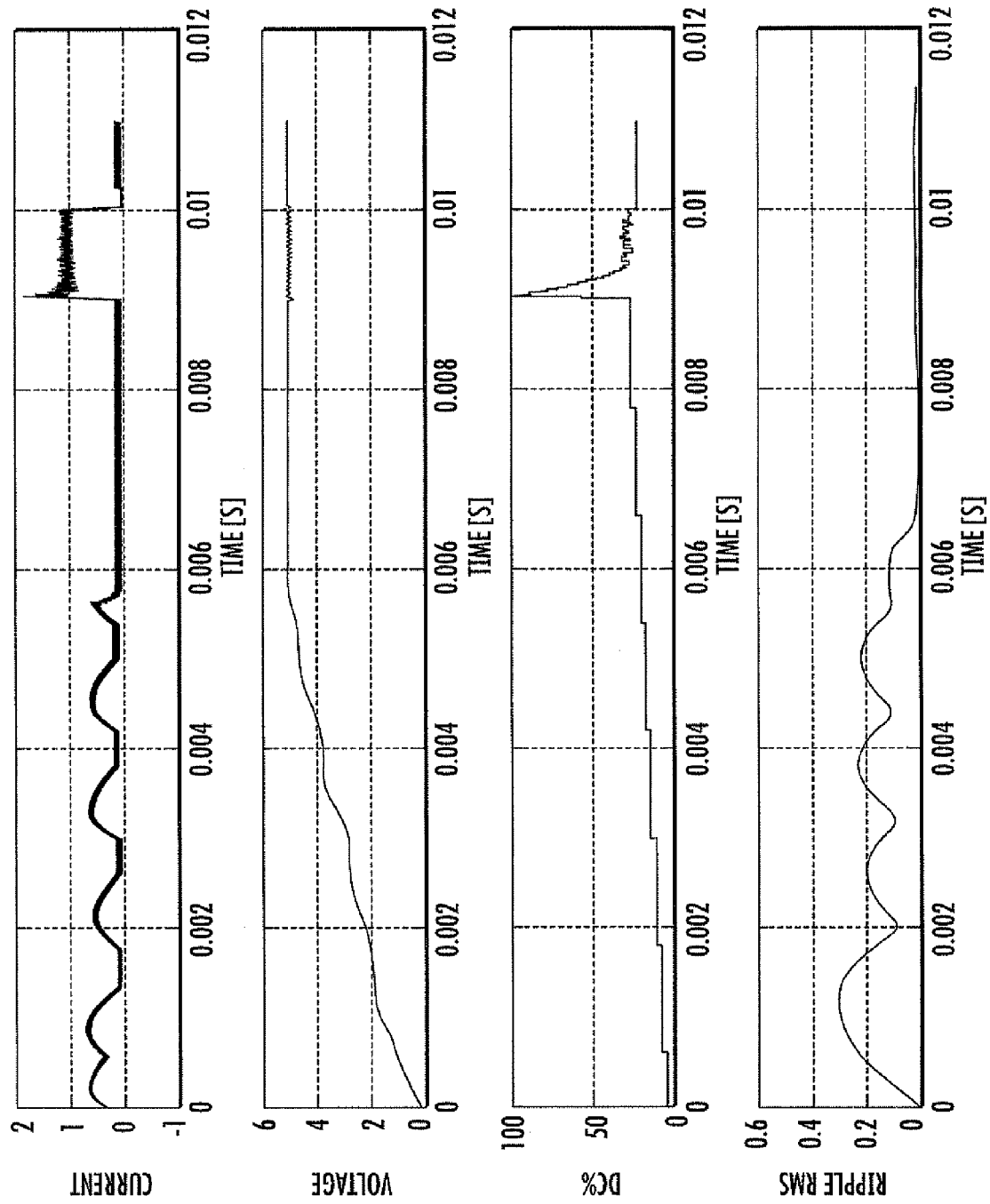
FIGS. 23 and 25 show simulation graphs of the functioning of the regulator of FIG. 3 implementing an embodiment of the method according to the present invention, powering a resistive load absorbing a current of 50 mA and a current pulse of 1 A lasting 1 ms.
Figure 24:
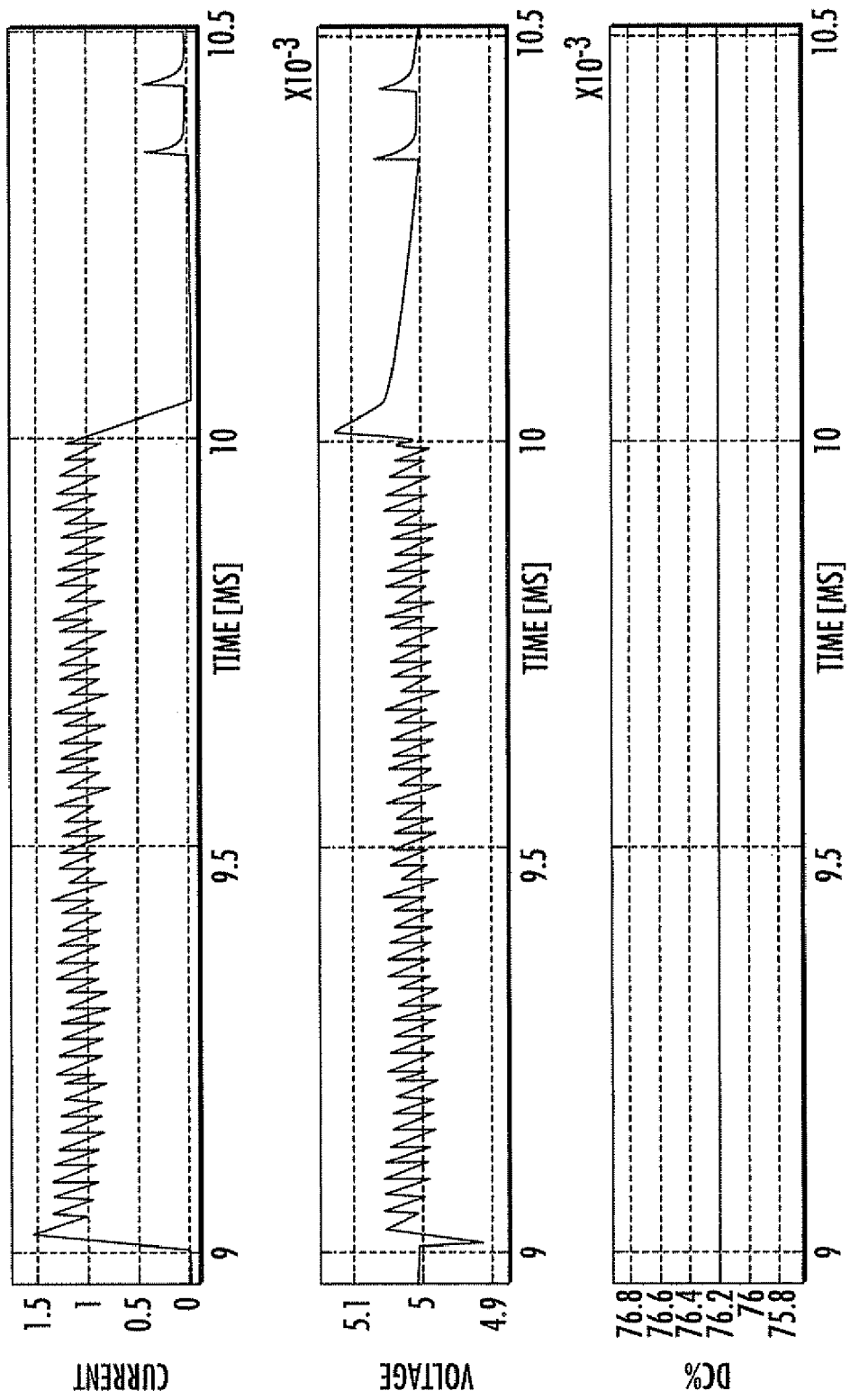
Figure 25:
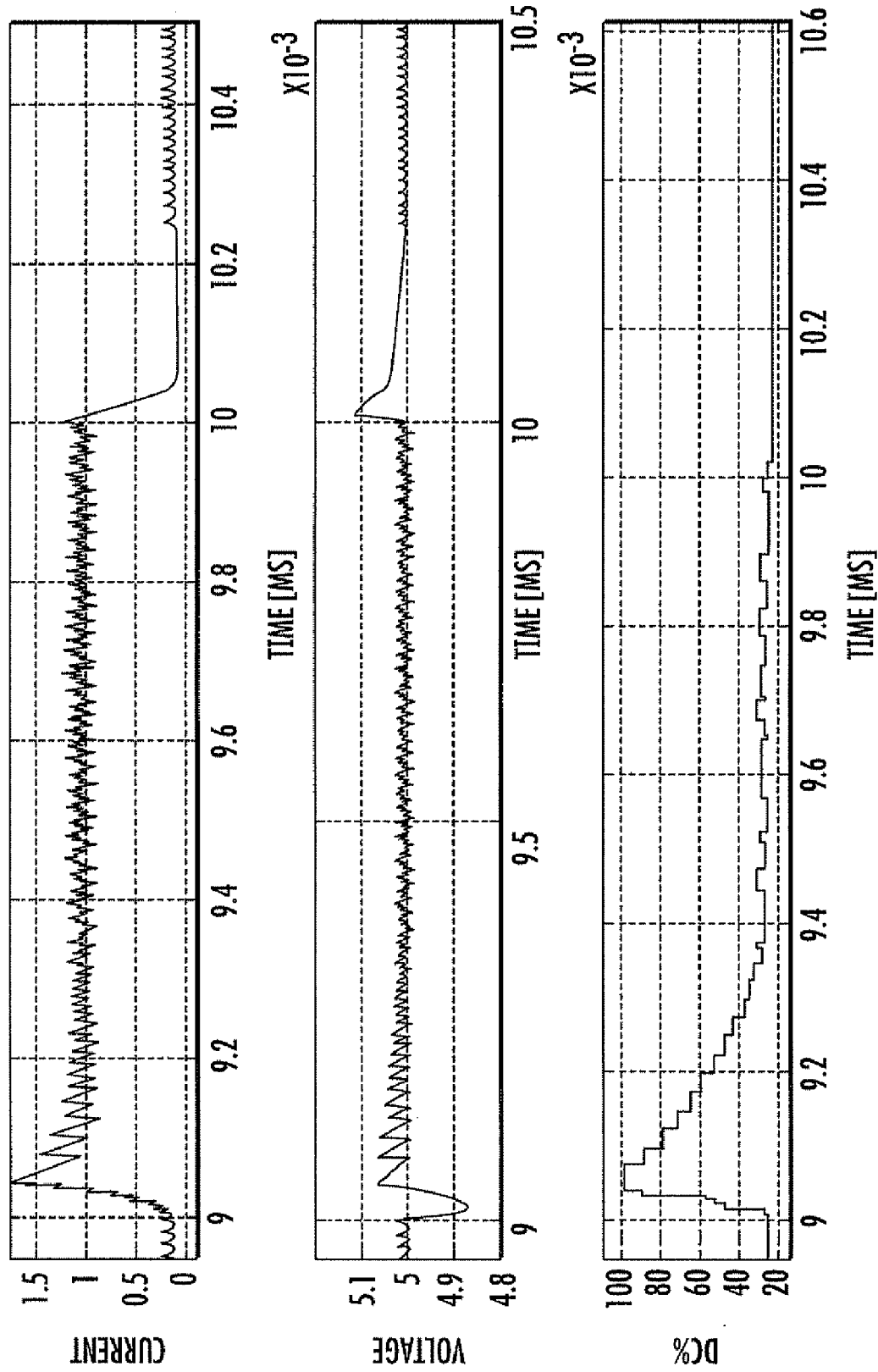

As shown in FIGS. 23 and 25, the regulator of FIG. 3 controlled with the method of this embodiment reacts promptly to the current load variation and adjusts immediately the value of the duty cycle. The output voltage is subject to an undershoot of about 140 mV (FIG. 25) and a 25 mV peak to peak variation in steady state, while the regulator of FIG. 3 controlled with a prior art control method presents an undershoot of 90 mV and a substantially faster transient response, but a larger peak-to-peak range of oscillation (50 mV) in steady state and an output offset. The RMS voltage ripple is evidently relevantly smaller.

The duty cycle may be decreased slowly because the SUPER DECREASE step has been excluded (SUP_DEC=0). As a matter of fact, it may not be necessary to decrease fast the duty cycle because, according to the method of this embodiment, the output voltage is reduced by skipping PWM pulses. A relatively slow decrease of the duty cycle affects only the RMS voltage ripple during transients.

Figure 26:
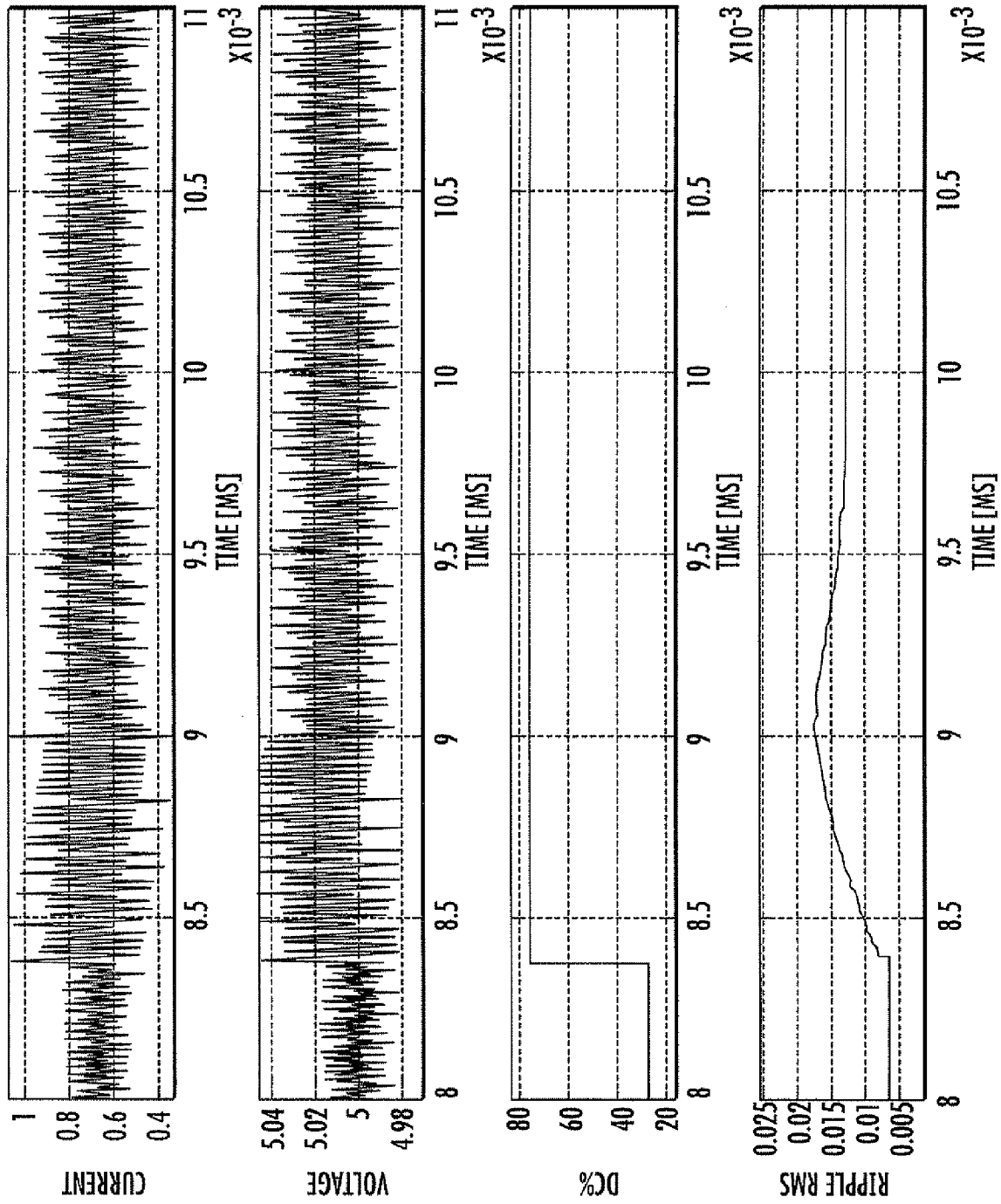
FIGS. 26 and 28 show simulation graphs of the functioning of the regulator of FIG. 3 implementing a prior art pulse skipping technique, powering a resistive load absorbing a current of 0.7 A with a negative step variation of the input voltage Vin at 9 ms.
Figure 27:
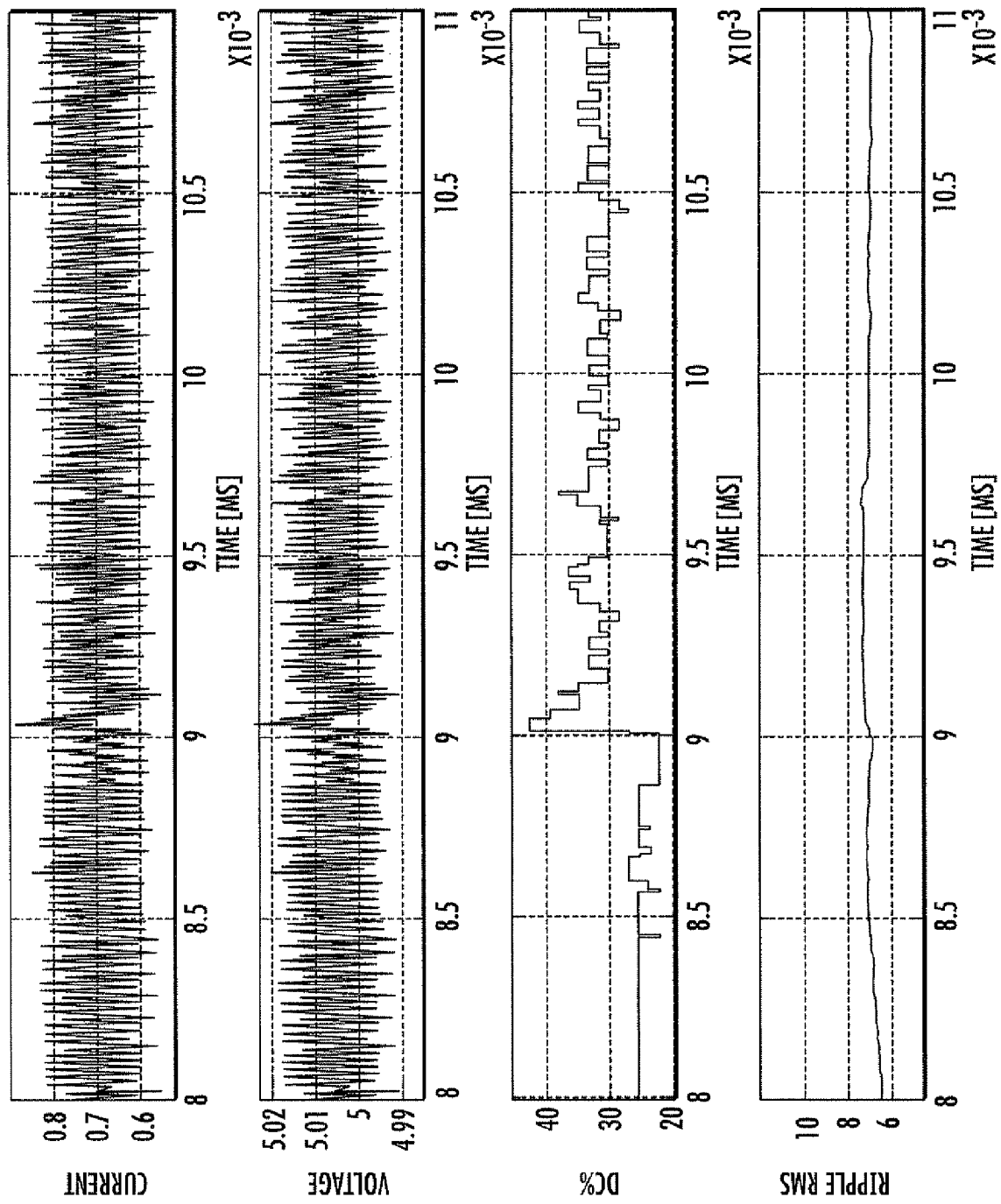
FIGS. 27 and 29 show simulation graphs of the functioning of the regulator of FIG. 3 implementing an embodiment of the method according to the present invention, powering a resistive load absorbing a current of 0.7 A with a negative step variation of the input voltage Vin at 9 ms.
Figure 28:
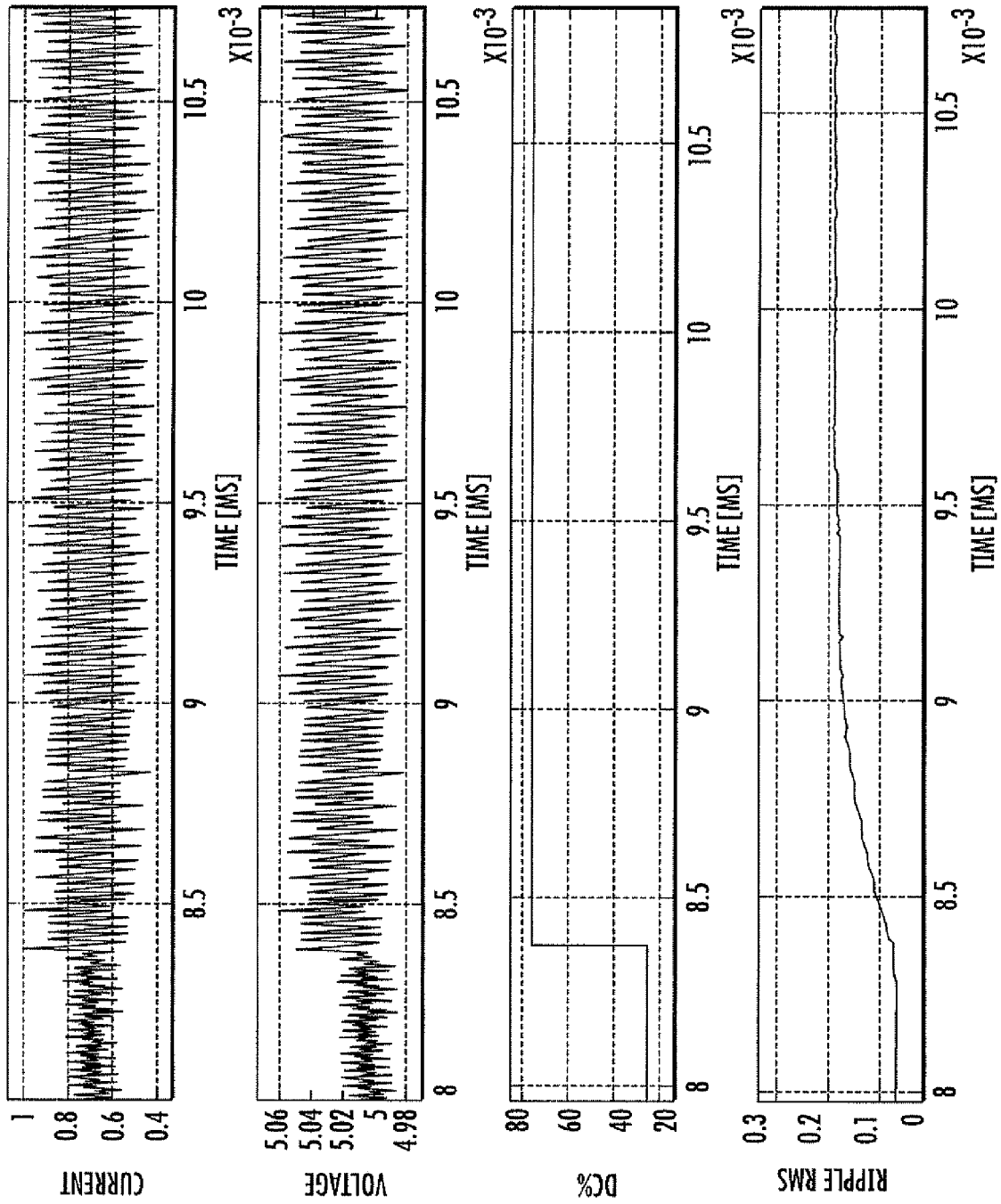
Figure 29:
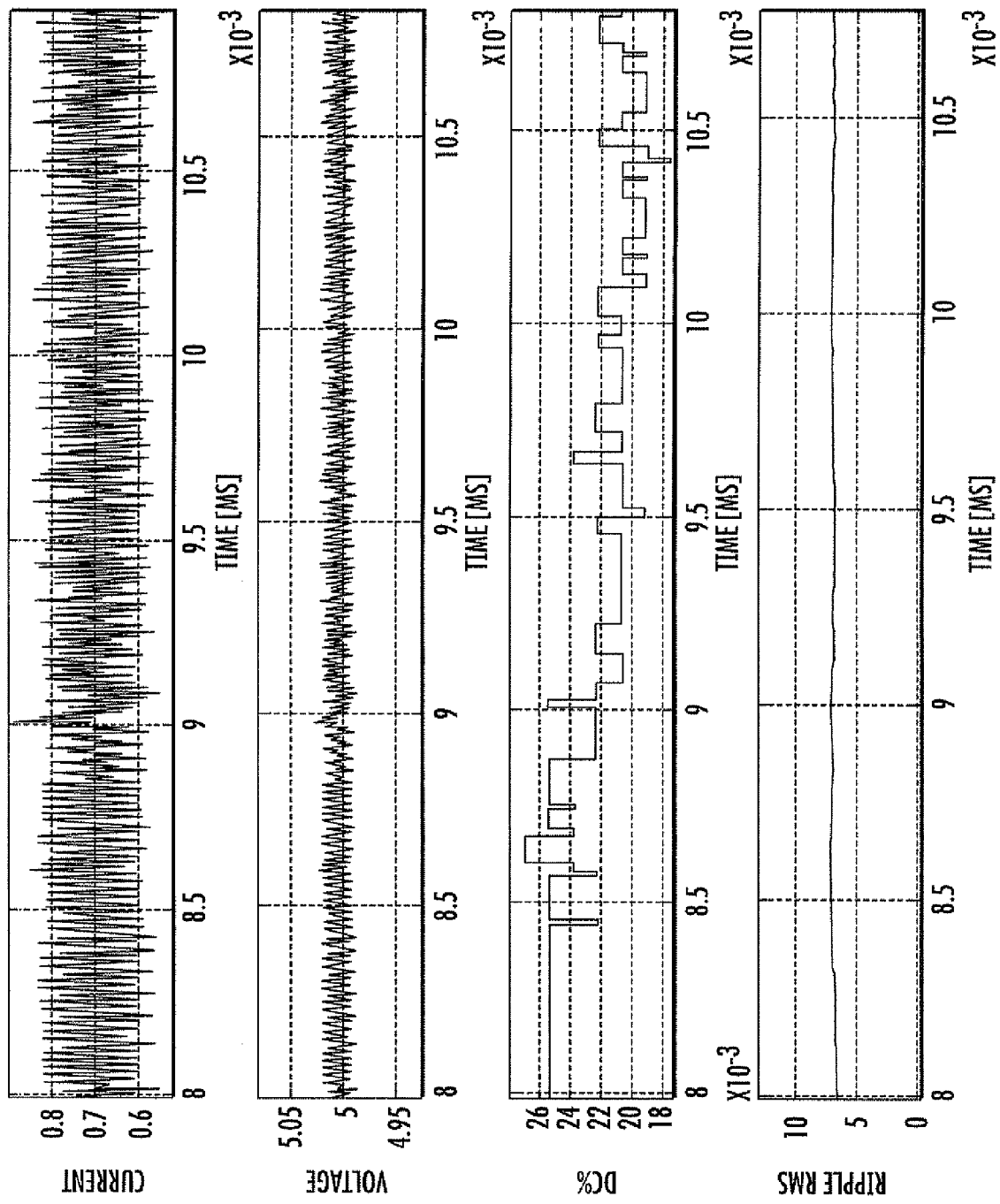

Figures from 26 to 29 show simulation graphs for a resistive load absorbing a current of 0.7 A with a negative (FIGS. 26 and 27) and a positive (FIGS. 28 and 29) input voltage step at 9 ms, when the regulator of FIG. 3 is controlled with a prior art control method (FIGS. 26 and 28) and with the method of this embodiment (FIGS. 27 and 29). The advantages of using this method are evident: there may be no output offset voltage, a fast response to load variations and the duty cycle is adjusted fast and this allows to obtain a relevantly smaller RMS voltage ripple (about 7 mV against about 17 mV).

The invention claimed is:

1. A method of feedback controlling a switched regulator generating a regulated voltage on an output terminal and being driven by a pulse width modulated (PWM) signal that determines on-phases during which the output terminal is selectively connected to a supply line, and off-phases during which the output terminal is disconnected according to a pulse skipping mode, the method comprising:
comparing the regulated voltage with a reference voltage;
during the on-phase of the PWM signal, selectively connecting or disconnecting the supply line to the output terminal based upon the comparing for keeping the regulated voltage constant; and
incrementing, decrementing, or leaving unchanged a duty-cycle of the PWM signal at a given PWM cycle based upon the comparing and based upon prior control of the duty-cycle of the PWM signal.

2. The method according to claim 1 wherein incrementing the duty-cycle comprises:
checking whether a difference between the regulated voltage and the reference voltage has a sign; and
if the difference between the regulated voltage and the reference voltage has the sign, incrementing the duty-cycle by a first percentage.

3. The method according to claim 2 wherein incrementing the duty-cycle further comprises:
counting a number of consecutive PWM cycles where the duty-cycle is incremented;
if the duty-cycle is incremented and is not incremented at the next PWM cycle, resetting the number of consecutive PWM cycles where the duty-cycle has been incremented; and
if the duty-cycle is incremented and the number of consecutive PWM cycles where the duty-cycle is incremented is greater than or equal to a first threshold, incrementing the duty-cycle by a second percentage being greater than the first percentage.

4. The method according to claim 1 wherein decrementing the duty-cycle comprises:
checking whether at least a plurality of PWM pulses has been skipped in a first number of consecutive PWM pulses before a last PWM pulse; and
if the plurality of PWM pulses has been skipped in the first number of consecutive PWM pulses before the last PWM pulse, decrementing the duty-cycle by a third percentage.

5. The method according to claim 4 wherein decrementing the duty-cycle further comprises:
counting a second number of consecutive PWM cycles where the duty-cycle is decremented;
if the duty-cycle is decremented and is not decremented at the next PWM cycle, resetting the second number; and
if the duty-cycle is decremented and the second number is less than a second threshold, decrementing the duty-cycle by the third percentage.

6. The method according to claim 5 wherein if the duty-cycle is not decremented or the second number is not less than the second threshold, decrementing the duty-cycle by a fourth percentage being greater than the third percentage.

7. A method of controlling a switched regulator generating a regulated voltage on an output terminal and being driven by a pulse width modulated (PWM) signal that determines on-phases during which the output terminal is selectively connected to a supply line, and off-phases during which the output terminal is disconnected according to a pulse skipping mode, the method comprising:

during the on-phase of the PWM signal, selectively connecting or disconnecting the supply line to the output terminal based upon a difference between a regulated voltage and the reference voltage for keeping the regulated voltage constant; and incrementing, decrementing, or leaving unchanged a duty-cycle of the PWM signal at a PWM cycle based upon the difference between the regulated voltage and the reference voltage and based upon prior control of the duty-cycle of the PWM signal.

8. The method according to claim 7 wherein incrementing the duty-cycle comprises:

checking whether the difference between the regulated voltage and the reference voltage has a sign; and if the difference between the regulated voltage and the reference voltage has the sign, incrementing the duty-cycle by a first percentage.

9. The method according to claim 7 wherein decrementing the duty-cycle comprises:

checking whether at least a plurality of PWM pulses has been skipped in a first number of consecutive PWM pulses before a last PWM pulse; and if the plurality of PWM pulses has been skipped in the first number of consecutive PWM pulses before the last PWM pulse, decrementing the duty-cycle by a third percentage.

10. A switched regulator generating a regulated voltage comprising:

an output terminal;

a generator providing a pulse width modulated (PWM) signal for determining on-phases during which said output terminal is selectively connected to a supply line and off-phases during which said output terminal is disconnected;

a comparator for comparing the regulated voltage and a reference voltage and generating a comparison signal; and a logic controller receiving the comparison signal and the PWM signal, and generating a logic signal for selectively connecting the supply line to said output terminal during the on-phase of the PWM signal according to a pulse skipping mode based upon the logic signal and for keeping the regulated voltage constant;

said generator for incrementing, decrementing, or leaving unchanged a duty-cycle of the PWM signal at a given PWM cycle based upon the comparison signal an based upon prior control of the duty-cycle of the PWM signal.

11. The switched regulator according to claim 10 wherein incrementing the duty-cycle comprises:

checking whether a difference between the regulated voltage and the reference voltage has a sign; and if the difference between the regulated voltage and the reference voltage has the sign, incrementing the duty-cycle by a first percentage.

12. The switched regulator according to claim 11 wherein incrementing the duty-cycle further comprises:

counting a number of consecutive PWM cycles where the duty-cycle is incremented;

if the duty-cycle is incremented and is not incremented at the next PWM cycle, resetting the number of consecutive PWM cycles where the duty-cycle has been incremented; and if the duty-cycle is incremented and the number of consecutive PWM cycles where the duty-cycle is incremented is greater than or equal to a first threshold, incrementing the duty-cycle by a second percentage being greater than the first percentage.

13. The switched regulator according to claim 10 wherein decrementing the duty-cycle comprises:

checking whether at least a plurality of PWN pulses has been skipped in a first number of consecutive PWM pulses before a last PWN pulse; and if the plurality of PWM pulses has been skipped in the first number of consecutive PWM pulses before the last PWM pulse, decrementing the duty-cycle by a third percentage.

14. The switched regulator according to claim 13 wherein decrementing the duty-cycle further comprises:

counting a second number of consecutive PWM cycles where the duty-cycle is decremented;

if the duty-cycle is decremented and is not decremented at the next PWM cycle, resetting the second number; and if the duty-cycle is decremented and the second number is less than a second threshold, decrementing the duty-cycle by the third percentage.

15. The switched regulator according to claim 14 wherein if the duty-cycle is not decremented or the second number is not less than the second threshold, decrementing the duty-cycle by a fourth percentage being greater than the third percentage.

* * * * *

UNITED STATES PATENT AND TRADEMARK OFFICE
CERTIFICATE OF CORRECTION

PATENT NO.        : 7,638,993 B2                                    Page 1 of 2
APPLICATION NO. : 11/767082
DATED             : December 29, 2010
INVENTOR(S)       : Valentino et al.

Figure 20:
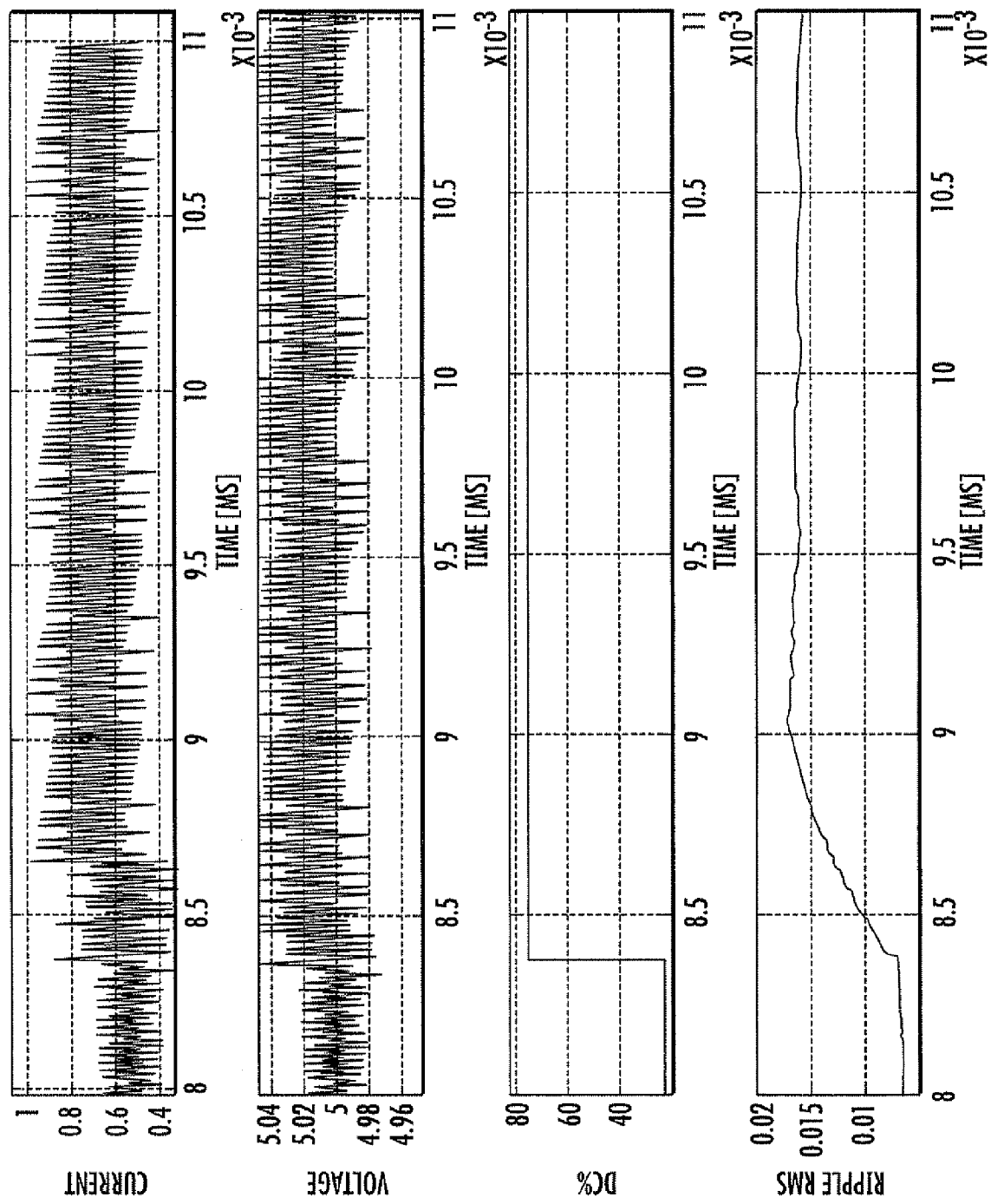
Figure 21:
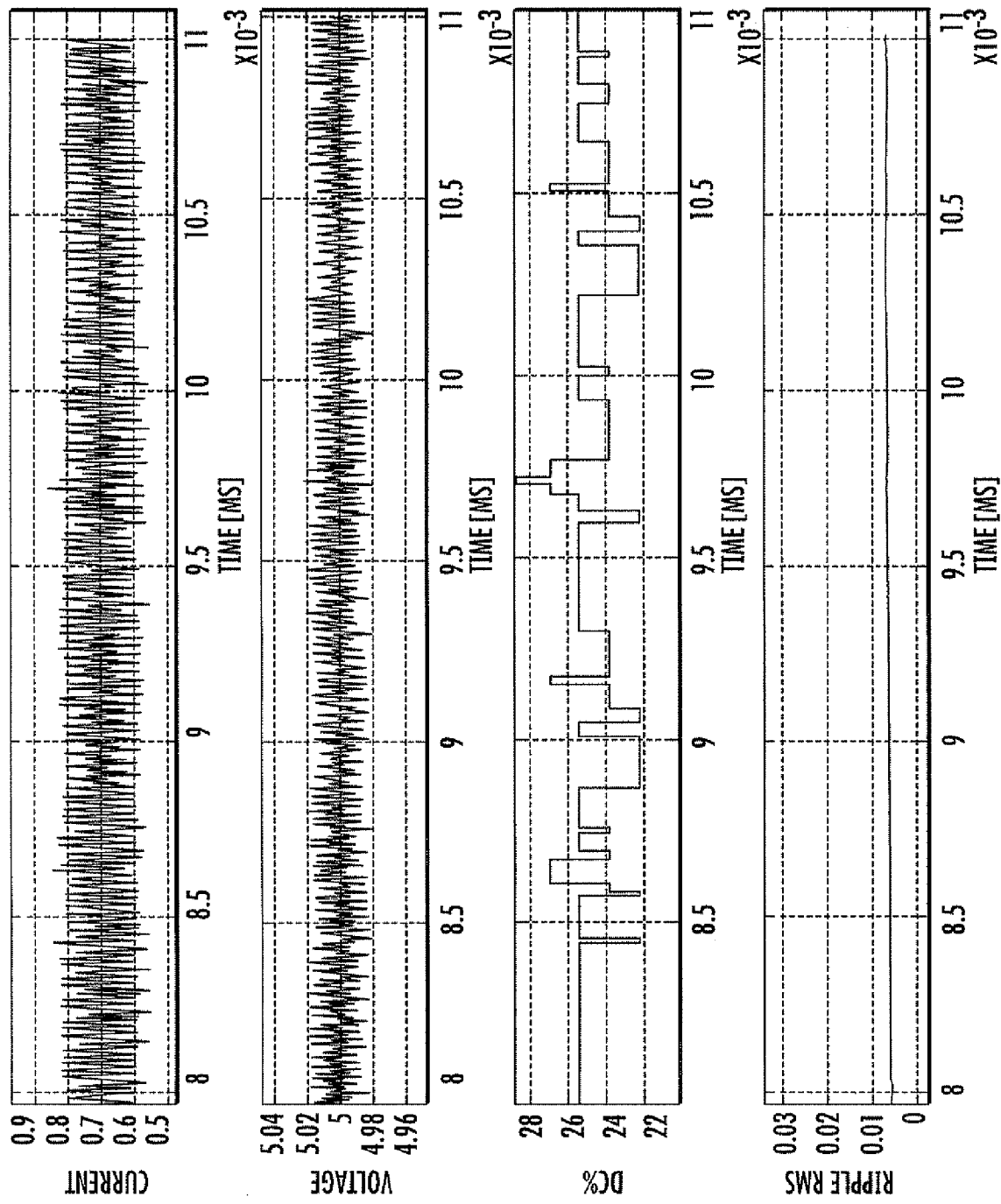
Figure 22:
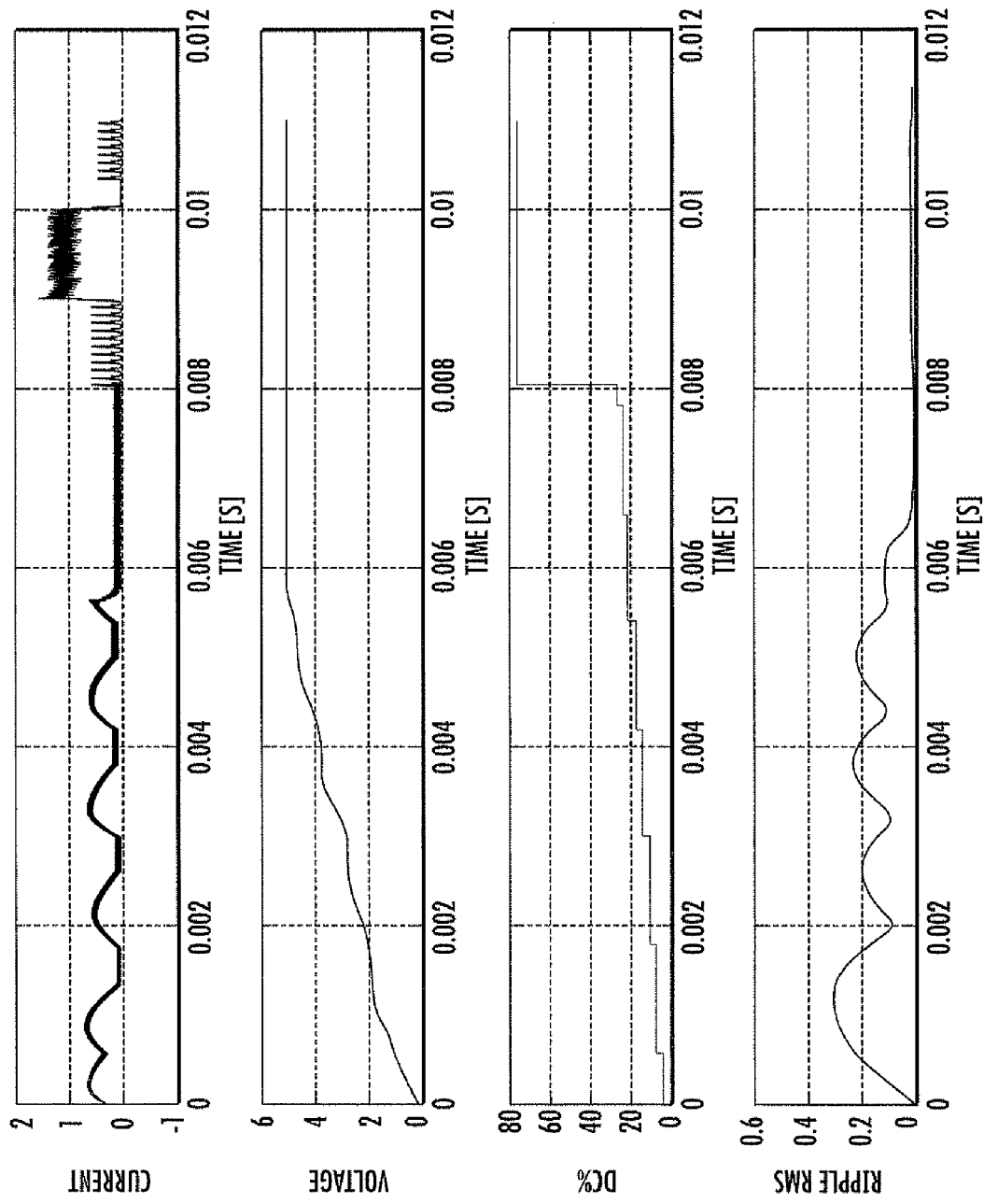
FIGS. 22 and 24 show simulation graphs of the functioning of the regulator of FIG. 3 implementing a prior art pulse skipping technique, powering a resistive load absorbing a current of 50 mA and a current pulse of 1 A lasting 1 ms.

It is certified that error appears in the above-identified patent and that said Letters Patent is hereby corrected as shown below:

In the Drawings        Delete: FIG 20
                       Insert: New FIG 20

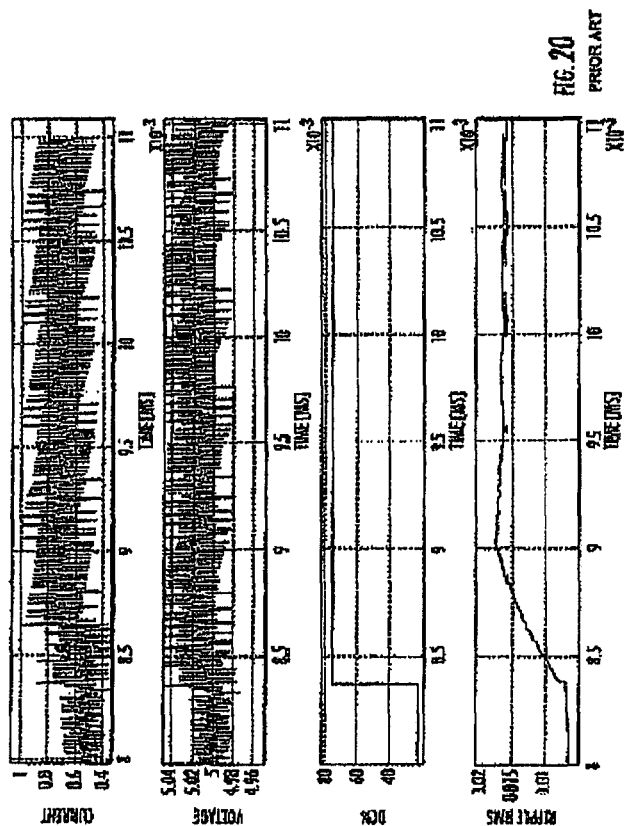

Signed and Sealed this

Twenty-sixth Day of October, 2010

David J. Kappos
*Director of the United States Patent and Trademark Office*

CERTIFICATE OF CORRECTION (continued)
U.S. Pat. No. 7,638,993 B2

In the Specifications:
Column 6, Line 57　　　　　　　　Delete: "Vret"
　　　　　　　　　　　　　　　　　Insert: --Vref--

In the Claims:
Column 10, Line 1, Claim 10　　　 Delete: "an"
　　　　　　　　　　　　　　　　　Insert: --and--